(12) United States Patent
Nakatsuka

(10) Patent No.: US 12,463,164 B2
(45) Date of Patent: Nov. 4, 2025

(54) SEMICONDUCTOR MEMORY DEVICE

(71) Applicant: KIOXIA CORPORATION, Tokyo (JP)

(72) Inventor: Keisuke Nakatsuka, Kobe Hyogo (JP)

(73) Assignee: Kioxia Corporation, Tokyo (JP)

( * ) Notice: Subject to any disclaimer, the term of this patent is extended or adjusted under 35 U.S.C. 154(b) by 712 days.

(21) Appl. No.: 17/683,083

(22) Filed: Feb. 28, 2022

(65) Prior Publication Data

US 2022/0406742 A1    Dec. 22, 2022

(30) Foreign Application Priority Data

Jun. 16, 2021    (JP) .................................. 2021-099966

(51) Int. Cl.

| H01L 23/00 | (2006.01) |
|---|---|
| G11C 16/04 | (2006.01) |
| G11C 16/26 | (2006.01) |
| H01L 25/065 | (2023.01) |
| H01L 25/18 | (2023.01) |

(52) U.S. Cl.
CPC .......... H01L 24/08 (2013.01); G11C 16/0483 (2013.01); G11C 16/26 (2013.01); H01L 25/0657 (2013.01); H01L 25/18 (2013.01); H01L 2224/08145 (2013.01); H01L 2924/1431 (2013.01); H01L 2924/14511 (2013.01)

(58) Field of Classification Search
CPC .................. H01L 2224/08145; G11C 16/0483
See application file for complete search history.

(56) References Cited

U.S. PATENT DOCUMENTS

| 9,960,181 B1 * | 5/2018 | Cui ........................ H10B 43/50 |
| 10,651,153 B2 | 5/2020 | Fastow et al. |
| 10,741,527 B2 | 8/2020 | Tagami et al. |
| 2013/0003433 A1 * | 1/2013 | Hishida .................... G11C 7/18 |
| | | 365/51 |
| 2013/0336065 A1 * | 12/2013 | Morooka ........... G11C 16/3427 |
| | | 365/185.17 |
| 2018/0130515 A1 | 5/2018 | Zawodny |
| 2018/0261575 A1 * | 9/2018 | Tagami ............... H01L 25/0657 |
| 2019/0088676 A1 * | 3/2019 | Tagami .................... H01L 24/04 |
| 2020/0203329 A1 | 6/2020 | Kanamori et al. |
| 2020/0294958 A1 | 9/2020 | Shibata |
| 2020/0294971 A1 | 9/2020 | Tanaka et al. |
| 2021/0020204 A1 | 1/2021 | Tanzawa |

* cited by examiner

*Primary Examiner* — Erik Kielin
(74) *Attorney, Agent, or Firm* — Kim & Stewart LLP

(57) ABSTRACT

A semiconductor memory device includes first and second memory cell arrays. The first array includes a first semiconductor portion, extending in a first direction, on which a first memory cell and a first select transistor are formed, a first word line connected to the first cell, a first select gate line connected to the first transistor, and a first bit line connected to the first semiconductor portion. The second array includes a second semiconductor portion, extending along the first direction, on which a second memory cell and a second select transistor are formed, a second word line connected to the second cell, a second select gate line connected to the second transistor, and a second bit line connected to the second semiconductor portion. The first and second word lines are electrically connected, but the first and second select gate lines are not electrically connected.

13 Claims, 23 Drawing Sheets

SEMICONDUCTOR MEMORY DEVICE

CROSS-REFERENCE TO RELATED APPLICATION

This application is based upon and claims the benefit of priority from Japanese Patent Application No. 2021-099966, filed Jun. 16, 2021, the entire contents of which are incorporated herein by reference.

FIELD

Embodiments described herein relate generally to a semiconductor memory device.

BACKGROUND

A NAND flash memory is known as one type of semiconductor memory device.

DETAILED DESCRIPTION

Figure 1:
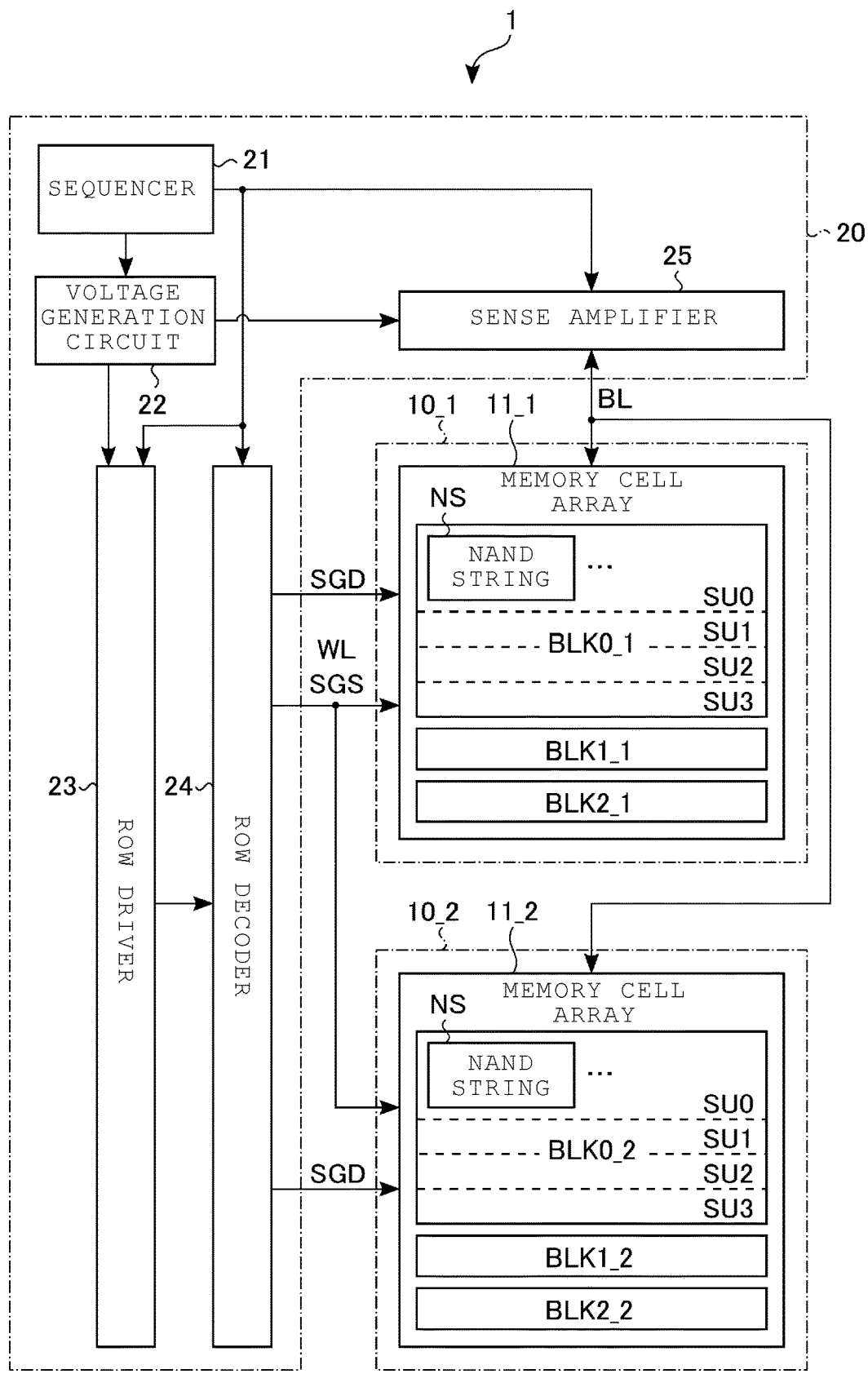
FIG. 1 is a block diagram illustrating a semiconductor memory device according to a first embodiment.

Embodiments provide a semiconductor memory device that can prevent an increase in chip area.

In general, according to one embodiment, a semiconductor memory device includes a first memory cell array and a second memory cell array above the first memory cell array in a first direction. The first memory cell array includes a first semiconductor portion that extends along the first direction. A first memory cell and a first select transistor are formed on the first semiconductor portion. A first word line is connected to a gate of the first memory cell. A first select gate line is connected to a gate of the first select transistor, and a first bit line is electrically connected to the first semiconductor portion. The second memory cell array includes a second semiconductor portion that extends along the first direction an on which a second memory cell and a second select transistor are formed. A second word line is connected to a gate of the second memory cell. A second select gate line is connected to a gate of the second select transistor, and a second bit line is electrically connected to the second semiconductor. The first and second word lines are electrically connected to each other, but the first and second select gate lines are not electrically connected to each other.

Hereinafter, certain example embodiments will be described with reference to the drawings. In the following description, elements having substantially the same function and configuration are denoted by the same reference numerals. Redundant descriptions may be omitted. In addition, the present disclosure illustratively describes devices and methods for embodying the technical idea of the embodiments. The technical idea of the embodiments are generally not limited by the material, shape, structure, arrangement, and the like of the components of the specifically described examples. Various changes may be made to the embodiments without departing from the spirit of the present disclosure. These embodiments and modifications thereof are included in the scope of the disclosure set forth in the claims and the equivalents thereof.

1. First Embodiment

A semiconductor memory device according to a first embodiment will be described.

1.1 Overall Configuration of Semiconductor Memory Device

First, an example of the overall configuration of the semiconductor memory device 1 will be described with reference to FIG. 1. The connections between the components of the semiconductor memory device 1 are illustrated by arrow lines in FIG. 1, but are not limited to those shown therein.

The semiconductor memory device 1 is, for example, a three-dimensional stacked NAND flash memory. The three-dimensional stacked NAND flash memory includes a plurality of nonvolatile memory cell transistors arranged three-dimensionally on a semiconductor substrate.

As illustrated in FIG. 1, the semiconductor memory device 1 includes a plurality of array chips 10 and a circuit chip 20. The array chip 10 is a chip on which an array of nonvolatile memory cell transistors is disposed. The circuit chip 20 is a chip on which a circuit for controlling the array chip 10 is disposed. The semiconductor memory device 1 of this embodiment is formed by bonding the plurality of array chips 10 and the circuit chip 20. Hereinafter, when the array chip 10 and the circuit chip 20 are not distinguished from each other, the array chip 10 or the circuit chip 20 is simply referred to as "chip".

In the example of FIG. 1, the semiconductor memory device 1 includes two array chips 10_1 and 10_2. The number of array chips 10 may be three or more.

The array chip 10 includes a memory cell array 11. The memory cell array 11 is a region in which nonvolatile memory cell transistors are arranged three-dimensionally. Hereinafter, the memory cell array 11 of the array chip 10_1 is referred to as a memory cell array 11_1, and the memory cell array 11 of the array chip 10_2 is referred to as a memory cell array 11_2.

The memory cell array 11 includes a plurality of blocks BLK. The block BLK is, for example, a set of a plurality of memory cell transistors whose data is collectively erased. The plurality of memory cell transistors in the block BLK are correlated with rows and columns. In the example of FIG. 1, the memory cell array 11 includes BLK0, BLK1, and BLK2. Hereinafter, the blocks BLK of the memory cell array 11_1 are referred to as blocks BLK0_1, BLK1_1, and BLK2_1, and the blocks BLK of the memory cell array 11_2 are referred to as blocks BLK0_2, BLK1_2, and BLK2_2.

The block BLK includes a plurality of string units SU. The string unit SU is, for example, a set of a plurality of NAND strings NS that are collectively selected in a write operation or a read operation. In the example of FIG. 1, the block BLK includes four string units SU0, SU1, SU2, and SU3.

The string unit SU includes a plurality of NAND strings NS. The NAND string NS includes a set of a plurality of memory cell transistors connected in series.

The number of blocks BLKs in the memory cell array 11 and the number of string units SU in the block BLKs may be freely selected. A circuit configuration of the memory cell array 11 will be described later.

Next, the circuit chip 20 will be described. The circuit chip 20 includes a sequencer 21, a voltage generation circuit 22, a row driver 23, a row decoder 24, and a sense amplifier 25.

The sequencer 21 is a circuit that controls the semiconductor memory device 1. The sequencer 21 is connected to and controls the voltage generation circuit 22, the row driver 23, the row decoder 24, and the sense amplifier 25. The sequencer 21 controls the operation of the entire semiconductor memory device 1 based on the control of an external controller. More specifically, the sequencer 21 executes a write operation, a read operation, an erasing operation, and the like.

The voltage generation circuit 22 is a circuit that generates a voltage used for the write operation, the read operation, the erasing operation, and the like. The voltage generation circuit 22 is connected to the row driver 23, the sense amplifier 25, and the like. The voltage generation circuit 22 applies a voltage to the row driver 23, the sense amplifier 25, and the like.

The row driver 23 is a driver that applies a voltage to the row decoder 24. The row driver 23 is connected to the row decoder 24. The row driver 23 applies the voltage applied from the voltage generation circuit 22 to the row decoder 24 based on, for example, a signal indicating a row address (page address or the like). The row address is an address that designates a wiring in a row direction of the memory cell array 11. The page address is an address that designates a page to be described later. The address signal is supplied from an external controller.

The row decoder 24 is a circuit that decodes the row address. The row decoder 24 selects any block BLK in the memory cell array 11 based on the decoding result of the row address (block address and the like). The block address is an address that designates the block BLK.

More specifically, the row decoder 24 is connected to the memory cell array 11 via a plurality of word lines WL and a plurality of select gate lines SGD and SGS. The word line WL is a wiring used for controlling a memory cell transistor. The select gate lines SGD and SGS are wirings used for selecting a string unit SU. The row decoder 24 applies the voltage applied from the row driver 23 to the word line WL and the select gate lines SGD and SGS corresponding to the selected block BLK.

In this embodiment, the word line WL of the memory cell array 11_1 and the word line WL of the memory cell array 11_2 are connected in common to the row decoder 24. Similarly, the select gate line SGS of the memory cell array 11_1 and the select gate line SGS of the memory cell array 11_2 are connected in common to the row decoder 24. The select gate line SGD of the memory cell array 11_1 and the select gate line SGD of the memory cell array 11_2 are independently connected to the row decoder 24. That is, the select gate line SGD of the memory cell array 11_1 and the select gate line SGD of the memory cell array 11_2 are not electrically connected to each other. In other words, the memory cell array 11_1 and the memory cell array 11_2 share the word line WL and the select gate line SGS. Then, the memory cell array 11_1 and the memory cell array 11_2 do not share the select gate line SGD.

The sense amplifier 25 is a circuit for writing and reading data. The sense amplifier 25 senses data read from any string unit SU of any block BLK during a read operation. The sense amplifier 25 applies a voltage in accordance with write data to the memory cell array 11 during a write operation.

The sense amplifier 25 is connected to the memory cell array 11 via a plurality of bit lines BL. The bit line BL is connected in common to one NAND string NS of each string unit SU in the memory cell array 11. In this embodiment, the bit lines BL of the memory cell arrays 11_1 and 11_2 are connected in common to the sense amplifier 25. That is, the memory cell array 11_1 and the memory cell array 11_2 share the bit line BL.

1.2 Circuit Configuration of Memory Cell Array

Next, an example of the circuit configuration of the memory cell arrays 11_1 and 11_2 will be described with reference to FIG. 2.

Figure 2:
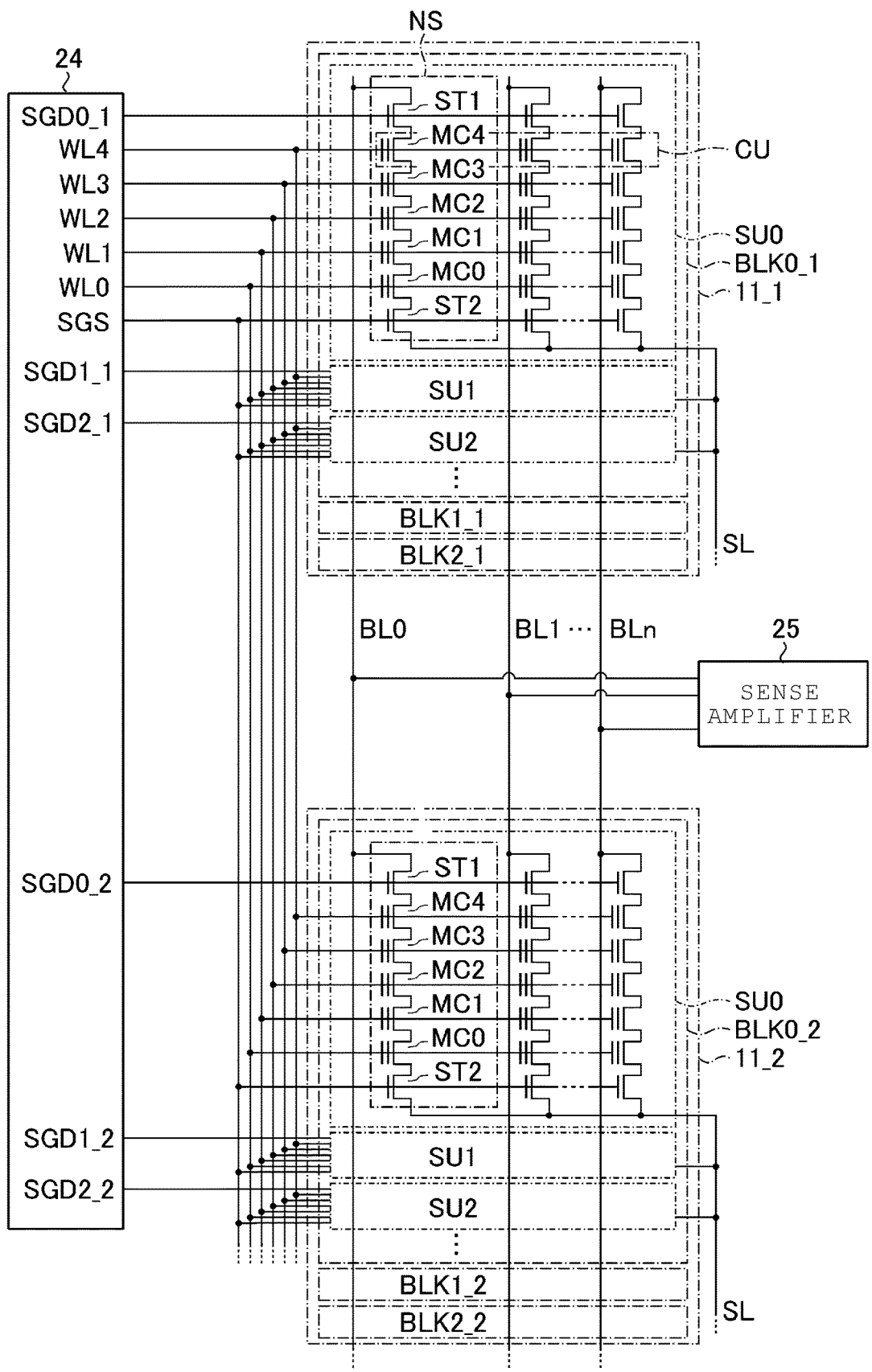
FIG. 2 is a circuit diagram of a memory cell array according to a first embodiment.

As illustrated in FIG. 2, each string unit SU of the memory cell arrays 11_1 and 11_2 includes a plurality of NAND strings NS.

The NAND string NS includes a plurality of memory cell transistors MC and select transistors ST1 and ST2. In the example of FIG. 2, the NAND string NS includes five memory cell transistors MC0 to MC4. The number of memory cell transistors MC is any number.

The memory cell transistor MC stores data in a nonvolatile manner. The memory cell transistor MC includes a control gate and a charge storage layer. The memory cell transistor MC may be a metal-oxide-nitride-oxide-silicon (MONOS) type memory cell transistor or a floating gate (FG) type memory cell transistor. In the MONOS type memory cell transistor, an insulating layer is used as the charge storage layer. In the FG type memory cell transistor, a conductor layer is used as the charge storage layer. Hereinafter, a case where the memory cell transistor MC is a MONOS type memory cell transistor will be described.

The select transistors ST1 and ST2 are used to select the string unit SU during various operations. The number of select transistors ST1 and ST2 is any number. It is sufficient that one or more select transistors ST1 and ST2 are provided in the NAND string NS.

The current paths of the memory cell transistors MC and the select transistors ST1 and ST2 in each NAND string NS are connected in series. In the example of FIG. 2, the current paths of the select transistor ST2, the memory cell transistors MC0, MC1, MC2, MC3, and MC4, and the select transistor ST1 are connected in series in this order, from the lower side to the upper side of FIG. 2. The drain of the select transistor ST1 is connected to a bit line BL. The source of the select transistor ST2 is connected to a source line SL.

The drains of the plurality of select transistors ST1 in the string unit SU are connected to different bit lines BL. In the example of FIG. 2, the drains of (n+1) (n is an integer of 0 or more) select transistors ST1 in the string unit SU are connected to (n+1) bit lines BL0 to BLn. Then, the drain of one select transistor ST1 in each of the string units SU of the memory cell arrays 11_1 and 11_2 is connected in common to a single bit line BL. That is, the memory cell arrays 11_1 and 11_2 share the bit line BL.

The control gates of the plurality of memory cell transistors MC0 to MC4 provided in one block BLK of the memory cell array 11_1 and one block BLK of the memory cell array 11_2 are connected in common to word lines WL0 to WL4, respectively. More specifically, a block BLK0_1 of the memory cell array 11_1 includes a plurality of memory cell transistors MC0. Similarly, a block BLK0_2 of the memory cell array 11_2 includes a plurality of memory cell transistors MC0. The control gates of these plurality of memory cell transistors MC0 in the blocks BLK0_1 and BLK0_2 are connected in common to a single word line WL0. The memory cell transistors MC1 to MC4 are also connected to the word lines WL1 to WL4, respectively. That is, the blocks BLK0_1 and BLK0_2 share the word lines WL. Similarly, the blocks BLK1_1 and BLK1_2 share the word lines WL. The blocks BLK2_1 and BLK2_2 share the word lines WL.

The gates of a plurality of select transistors ST2 provided in one block BLK of the memory cell array 11_1 and one block BLK of the memory cell array 11_2 are connected in common to one select gate line SGS. More specifically, for example, each of the blocks BLK0_1 and BLK0_2 includes the plurality of select transistors ST2. The gates of these plurality of select transistors ST2 in the blocks BLK0_1 and BLK0_2 are connected in common to one select gate line SGS. That is, the blocks BLK0_1 and BLK0_2 share the select gate line SGS. Similarly, the blocks BLK1_1 and BLK1_2 share the select gate line SGS. The blocks BLK2_1 and BLK2_2 share the select gate line SGS. The blocks BLK0_1 to BLK2_1 and BLK0_2 to BLK2_2 may share the select gate line SGS.

The gates of the plurality of select transistors ST1 in the string unit SU are connected in common to one select gate line SGD. More specifically, each string unit SU0 in the block BLK0_1 of the memory cell array 11_1 includes the plurality of select transistors ST1. The gates of the plurality of select transistors ST1 in the string unit SU0 are connected in common to a select gate line SGD0_1. Similarly, the gates of the plurality of select transistors ST1 in the string unit SU1 are connected in common to a select gate line SGD1_1. The gates of the plurality of select transistors ST1 in the string unit SU2 are connected in common to a select gate line SGD2_1. The same applies to the blocks BLK1_1 and BLK2_1.

Each string unit SU0 in the block BLK0_2 of the memory cell array 11_2 includes a plurality of select transistors ST1. The gates of the plurality of select transistors ST1 in the string unit SU0 are connected in common to a select gate line SGD0_2. Similarly, the gates of the plurality of select transistors ST1 in the string unit SU1 are connected in common to a select gate line SGD1_2. The gates of the plurality of select transistors ST1 in the string unit SU2 are connected in common to a select gate line SGD2_2. The same applies to the blocks BLK1_2 and BLK2_2.

The word lines WL0 to WL4, the select gate line SGS, and the select gate lines SGD0_1 to SGD2_1 and SGD0_2 to 2_2 are connected to the row decoder 24.

The bit line BL is connected to the sense amplifier 25.

The source line SL is shared, for example, between the plurality of blocks BLK of the memory cell array 11_1 and 11_2.

Hereinafter, a set of a plurality of memory cell transistors MC connected to a single word line WL in one string unit SU is referred to as a "cell unit CU". For example, when the memory cell transistor MC stores 1-bit data, storage capacity of the cell unit CU is defined as "one page data". Based on the number of bits of data stored in the memory cell transistor MC, the cell unit CU may have storage capacity of two pages or more of data.

1.3 Connection of Various Wirings Between Chips

Figure 3:
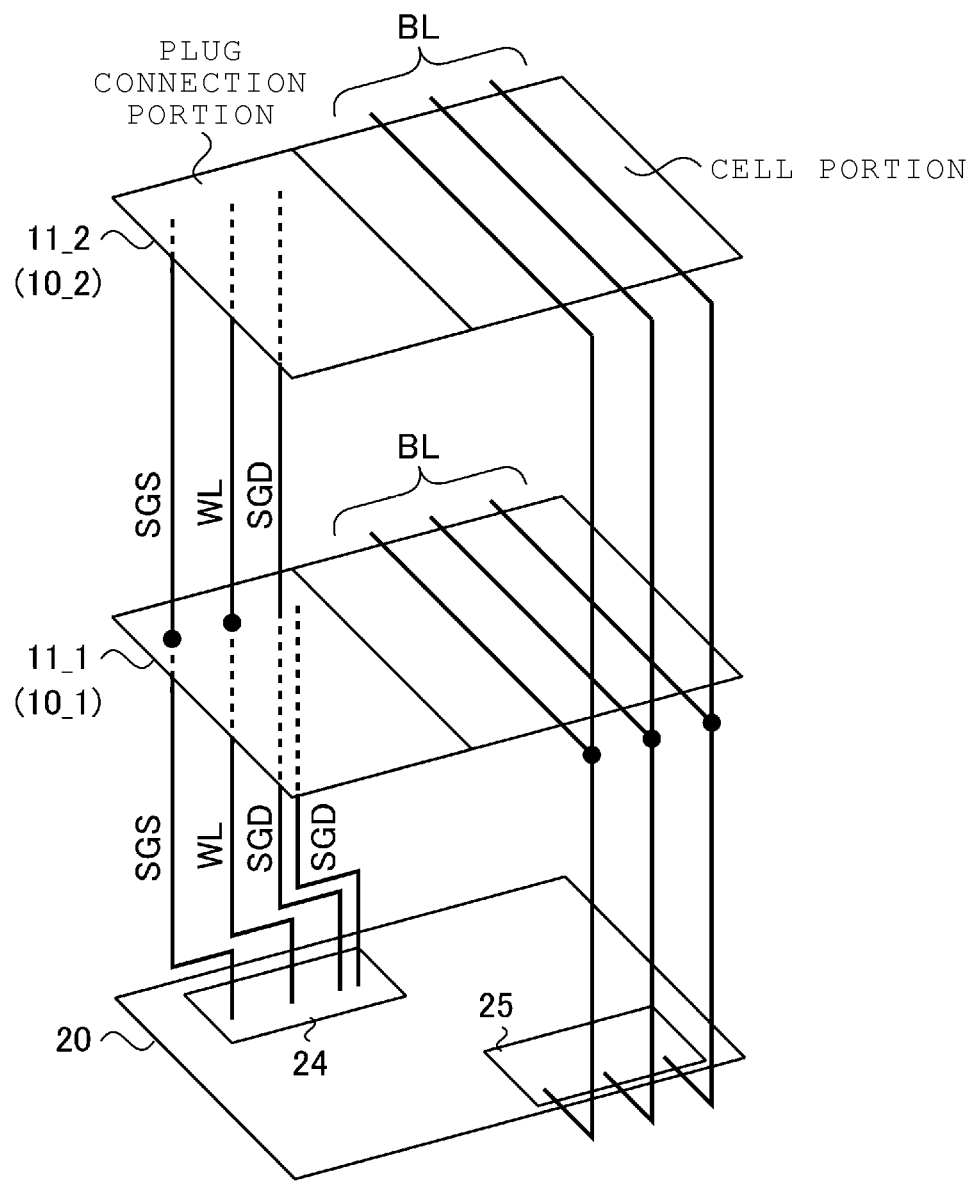
FIG. 3 schematically depicts an arrangement of a memory cell array and a circuit chip according to a first embodiment.

Next, the connection of various wirings between the chips will be described with reference to FIG. 3. FIG. 3 is a conceptual diagram illustrating the arrangement of the memory cell arrays 11_1 and 11_2 and the circuit chip 20.

As illustrated in FIG. 3, the memory cell array 11_1 is disposed on the circuit chip 20. Then, the memory cell array 11_2 is disposed on the memory cell array 11_1. In other words, the array chips 10_1 and 10_2 are stacked on the circuit chip 20.

The memory cell arrays 11_1 and 11_2 include a cell portion and a plug connection portion. The cell portion is a region in which the memory cell transistors are disposed. The plug connection portion is a region in which a plurality of contact plugs are connected to the word line WL and the select gate lines SGD and SGS.

The bit lines BL disposed in the cell portions of the memory cell arrays 11_1 and 11_2 are connected in common to the sense amplifier 25 of the circuit chip 20.

The word lines WL and the select gate line SGS of the memory cell arrays 11_1 and 11_2 are connected in common to the row decoder 24 of the circuit chip 20.

The select gate line SGD of the memory cell array 11_1 is connected to the row decoder 24 of the circuit chip 20. The select gate line SGD of the memory cell array 11_2 is connected to the row decoder 24 of the circuit chip 20. The select gate line SGD of the memory cell array 11_1 and the select gate line SGD of the memory cell array 11_2 are not electrically connected to each other.

1.4 Planar Configuration of Memory Cell Array

Figure 4:
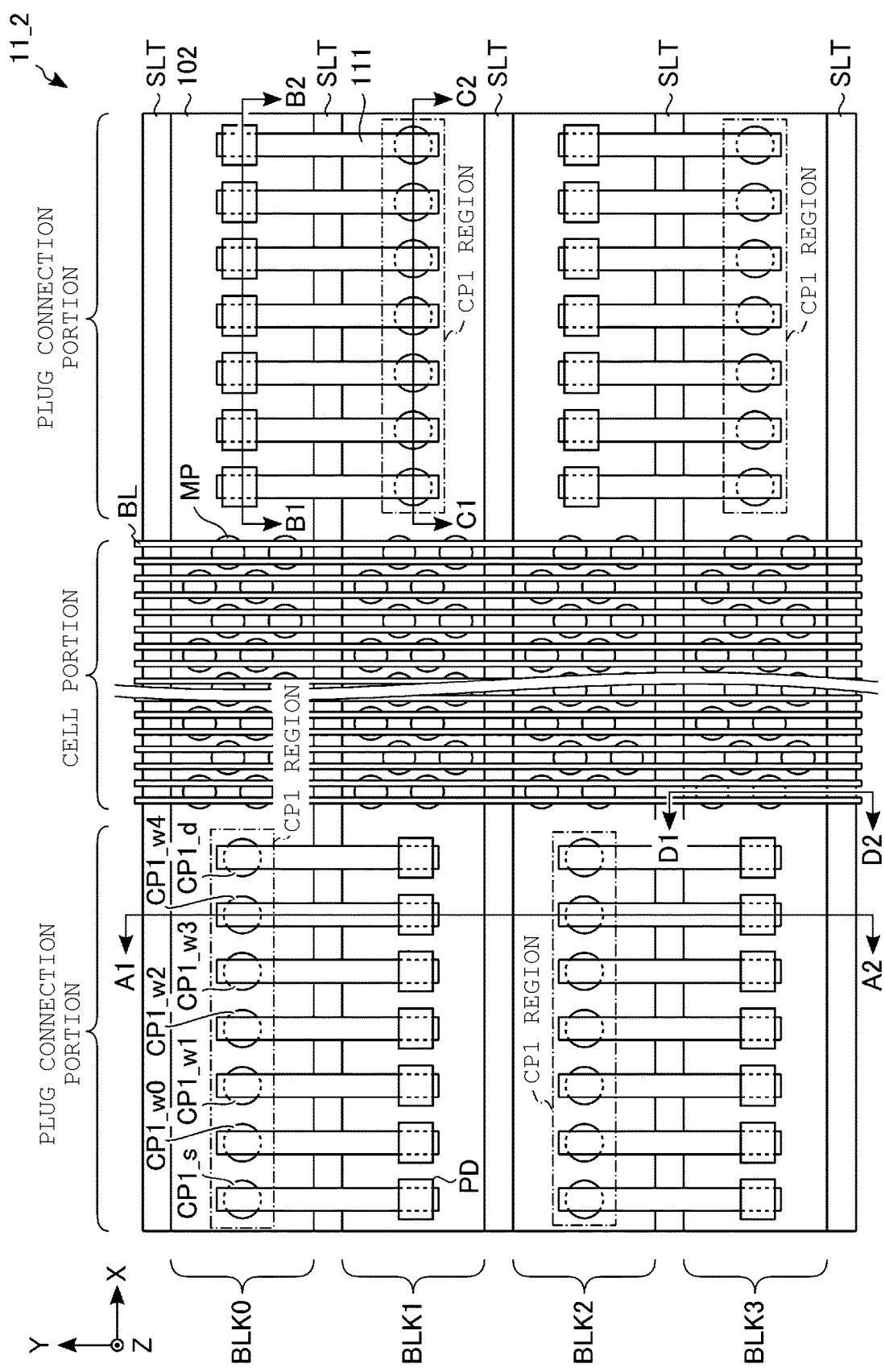
FIG. 4 is a plan view of a memory cell array according to a first embodiment.
Figure 5:
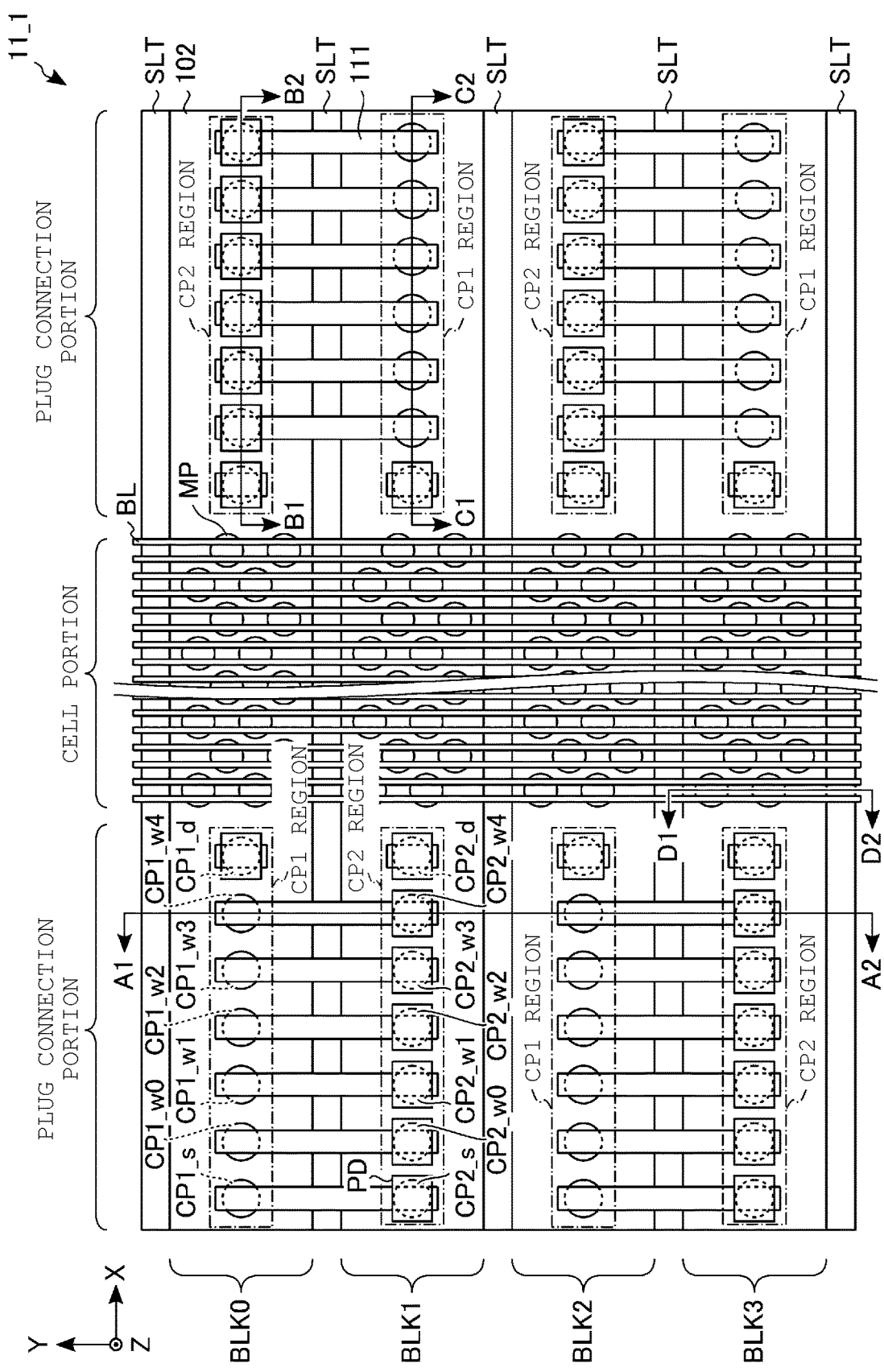
FIG. 5 is a plan view of a memory cell array according to a first embodiment.

Next, a configuration of the memory cell array 11 will be described with reference to FIGS. 4 and 5. FIG. 4 is a plan view of the memory cell array 11_2. FIG. 5 is a plan view of the memory cell array 11_1. In the examples of FIGS. 4 and 5, for simplification of the description, a case where each memory cell array 11 includes four blocks BLK0 to BLK3 and each block BLK includes one string unit SU will be described. In the examples of FIGS. 4 and 5, insulating layers are not illustrated for simplicity.

In the following description, the X-direction corresponds to the direction along which the word lines WL extend. The Y-direction intersects the X-direction. The Y-direction corresponds to the direction along which the bit lines BL extend. The Z-direction corresponds to the direction that intersects the X-direction and the Y-direction.

First, the planar configuration of the memory cell array 11_2 will be described.

As illustrated in FIG. 4, four blocks BLK0 to BLK3 are disposed side by side in the Y-direction from the upper side to the lower side of FIG. 4. In each block BLK, a plurality of wiring layers 102 are stacked so as to be spaced apart from each other in the Z-direction. For example, seven layers of wiring layers 102 that function as the select gate line SGS, the word lines WL0 to WL4, and the select gate line SGD are stacked. A slits SLT arise provided between two side surfaces of each wiring layer 102 directed in the Y-direction. The slit SLT extends in the X and Z-directions. The slit SLT separates the wiring layers 102 of two adjacent blocks BLK.

The block BLK includes the cell portion and the plug connection portion.

A plurality of memory pillars MPs are provided in the cell portion. The memory pillar MP is a pillar corresponding to the NAND string NS. Details of a structure of the memory pillar MP will be described later. The memory pillar MP extends in the Z-direction. The memory pillar MP penetrates or passes through the plurality of wiring layers 102 stacked in the Z-direction.

In the example of FIG. 4, the plurality of memory pillars MPs in the block BLK are disposed in four rows in a staggered arrangement in the X-direction. The arrangement of memory pillars MPs may be freely designed. The arrangement of the memory pillars MPs may be, for example, an 8-row staggered arrangement. The arrangement of the memory pillars MPs does not need to be staggered.

Above the memory pillar MP, a plurality of bit lines BL are disposed side by side in the X-direction. The bit line BL extends in the Y-direction. The memory pillar MP is electrically connected to any bit line BL.

The plug connection portion of the memory cell array 11_2 includes a CP1 region.

The CP1 region is a region in which a plurality of contact plugs CP1 are provided. The contact plug CP1 extends in the Z-direction. The contact plug CP1 is connected to any one of the wiring layers 102. Then, the contact plug CP1 is not electrically connected to the other wiring layers 102. In the example of FIG. 4, seven contact plugs CP1 are provided in one CP1 region. The seven contact plugs CP1 are connected to the seven wiring layers 102. Hereinafter, the contact plugs CP1 connected to the word lines WL0, WL1, WL2, WL3, and WL4 are referred to as contact plugs CP1_w0, CP1_w1, CP1_w2, CP1_w3, and CP1_w4, and the contact plugs CP1 connected to the select gate lines SGD and SGS are referred to as contact plugs CP1_d and CP1_s. In the example of FIG. 4, the contact plugs CP1_s, CP1_w0, CP1_w1, CP1_w2, CP1_w3, CP1_w4, and CP1_d are disposed in one row in this order from the end of the memory cell array 11_2 in the X-direction toward the cell portion. The arrangement of the contact plug CP1 is freely selected. For example, the contact plug CP1 may be disposed in two rows in a staggered pattern along the X-direction.

A wiring layer 111 is provided on the contact plug CP1. The wiring layer 111 extends in the Y-direction from a connection position with the contact plug CP1 to the upper part of an adjacent block BLK. More specifically, the wiring layer 111 provided on the contact plug CP1 of the block BLK0 extends to the upper part of the block BLK1. In other words, the wiring layer 111 provided on the contact plug CP1 of the block BLK1 extends to the upper part of the block BLK0. Additionally, the wiring layer 111 provided on the contact plug CP1 of the block BLK2 extends to the upper part of the block BLK3. In other words, the wiring layer 111 provided on the contact plug CP1 of the block BLK3 extends to the upper part of the block BLK2.

An electrode pad PD is provided on the wiring layer 111. The electrode pad PD is used for electrical connection with other chips.

Next, the planar configuration of the memory cell array 11_1 will be described. In the following, the features different from the planar configuration of the memory cell array 11_2 will be mainly described.

As illustrated in FIG. 5, the configuration of the cell portion is the same as that of the memory cell array 11_2.

The plug connection portion of the memory cell array 11_1 includes a CP2 region in addition to the CP1 region.

The configuration of the CP1 region is the same as that of the memory cell array 11_2.

The CP2 region is a region in which a plurality of contact plugs CP2 are provided. The contact plug CP2 extends in the Z-direction. The contact plug CP2 penetrates the memory cell array 11_1. The contact plug CP2 is not electrically connected to the wiring layer 102 of the memory cell array 11_1. The contact plug CP2 is electrically connected to the contact plug CP1 of the memory cell array 11_2 via the electrode pad PD of the array chip 10_2 and the wiring layer 111 described with reference to FIG. 4.

More specifically, the contact plug CP2 of the block BLK0 is electrically connected to the contact plug CP1 of the block BLK1 of the memory cell array 11_2. The contact plug CP2 of the block BLK1 is electrically connected to the contact plug CP1 of the block BLK0 of the memory cell array 11_2. The contact plug CP2 of the block BLK2 is electrically connected to the contact plug CP1 of the block BLK3 of the memory cell array 11_2. The contact plug CP2 of the block BLK3 is electrically connected to the contact plug CP1 of the block BLK2 of the memory cell array 11_2.

In the example of FIG. 5, seven contact plugs CP2 are provided in one CP2 region. The seven contact plugs CP2 correspond to the seven contact plugs CP1 of the memory cell array 11_2. Hereinafter, the contact plugs CP2 connected to the contact plugs CP1_w0, CP1_w1, CP1_w2, CP1_w3, and CP1_w4 of the memory cell array 11_2 are referred to as contact plugs CP2_w0, CP2_w1, CP2_w2, CP2_w3, and CP2_w4, and the contact plugs CP2 connected to the contact plugs CP1_d and CP1_s of the memory cell array 11_2 are referred to as contact plugs CP2_d and CP2_s.

The wiring layer 111 is provided on the contact plugs CP1 and CP2. The contact plugs CP1_w0 to CP1_w4 and CP1_s are connected to the contact plugs CP2_w0 to CP2_w4 and CP2_s of the adjacent block BLK via the wiring layers 111, respectively. The contact plug CP1_d is not connected to the contact plug CP2_d of the adjacent block BLK. That is, different wiring layers 111 are provided on the contact plugs CP1_d and CP2_d.

More specifically, the contact plug CP1_s of the block BLK0 is electrically connected to the contact plug CP2_s of the block BLK1. The contact plug CP1_w0 of the block BLK0 is electrically connected to the contact plug CP2_w0 of the block BLK1. The contact plug CP1_w1 of the block BLK0 is electrically connected to the contact plug CP2_w1 of the block BLK1. The contact plug CP1_w2 of the block BLK0 is electrically connected to the contact plug CP2_w2 of the block BLK1. The contact plug CP1_w3 of the block BLK0 is electrically connected to the contact plug CP2_w3 of the block BLK1. The contact plug CP1_w4 of block BLK0 is electrically connected to the contact plug CP2_w4 of block BLK1. The contact plug CP1_d of block BLK0 is not electrically connected to the contact plug CP2_d of block BLK1. The same applies to the other blocks BLKs.

That is, the word lines WL0 to WL4 and the select gate line SGS of the block BLK0 of the memory cell array 11_1 are electrically connected to the word lines WL0 to WL4 and the select gate line SGS of the block BLK0 of the memory cell array 11_2, respectively. Then, the select gate line SGD of the block BLK0 of the memory cell array 11_1 is not electrically connected to the select gate line SGD of the block BLK0 of the memory cell array 11_2. The same applies to the other blocks BLKs.

The electrode pad PD is provided on the wiring layer 111. Different wiring layers 111 are provided on the contact plug CP1_d and the contact plug CP2_d. The electrode pad PD is provided on each wiring layer 111.

1.5 Cross-Sectional Configuration of Semiconductor Memory Device

Next, a cross-sectional configuration of the semiconductor memory device 1 will be described.

1.5.1 Configuration of A1-A2 Cross Section

Figure 6:
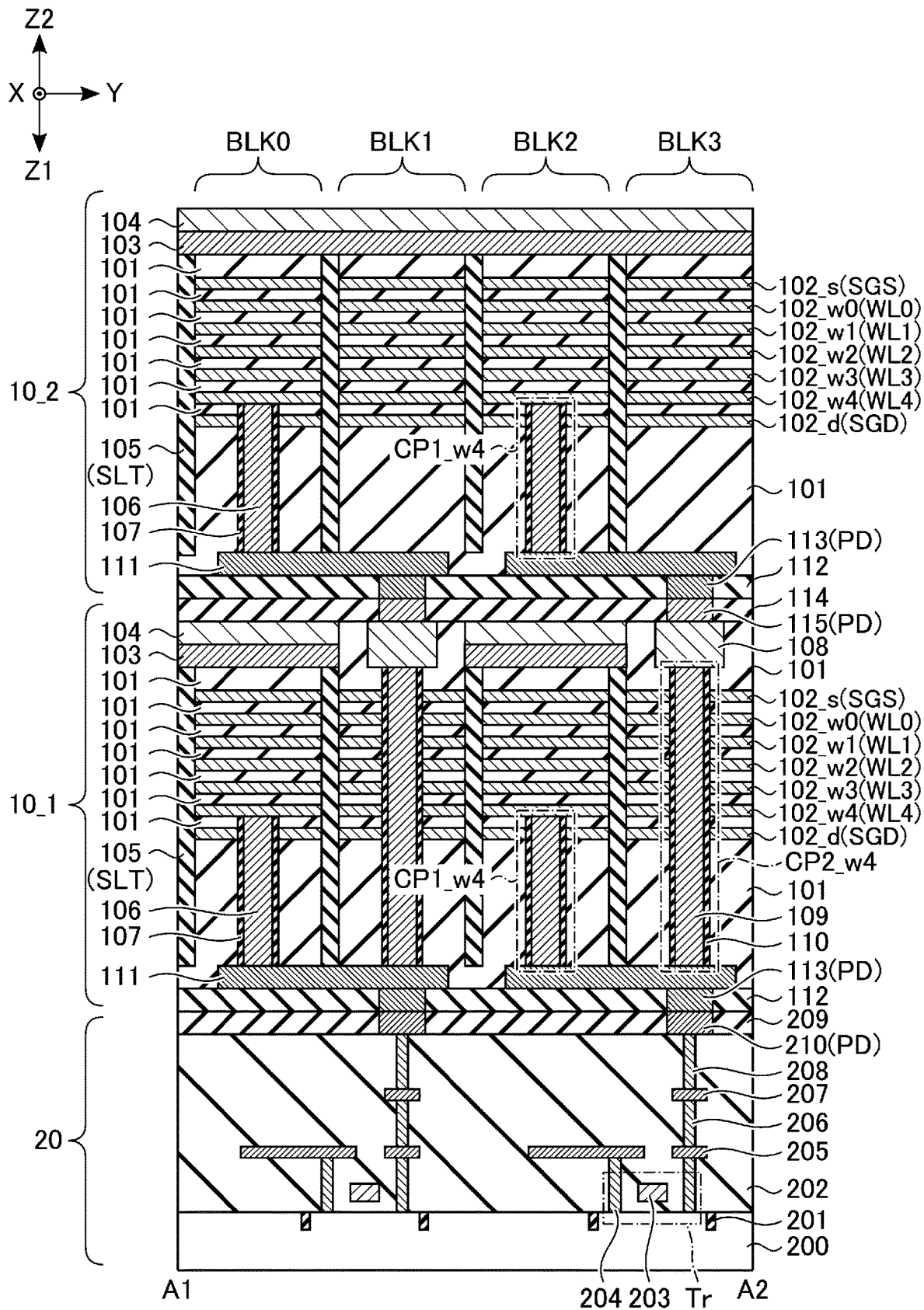
FIG. 6 is a cross-sectional view taken along line A1-A2 of FIGS. 4 and 5.

First, an example of the configuration of the A1-A2 cross section of the semiconductor memory device 1 will be described with reference to FIG. 6. FIG. 6 is a cross-sectional view taken along line A1-A2 of FIGS. 4 and 5. In the following description, the direction from the array chip 10 to the circuit chip 20 is referred to as a Z1-direction, and the direction from the circuit chip 20 to the array chip 10 is referred to a Z2-direction.

As illustrated in FIG. 6, the semiconductor memory device 1 has a configuration in which the array chips 10_1 and 10_2 and the circuit chip 20 are bonded together. Those chips are electrically connected to each other via the electrode pad PD provided thereon.

First, an internal configuration of the array chip 10_1 will be described.

The array chip 10_1 includes the memory cell array 11_1 and various wiring layers for connecting to the array chip 10_2 and the circuit chip 20.

The array chip 10_1 includes insulating layers 101, 105, 107, 110, 112, and 114, wiring layers 102, 103, 104, and 111, and conductors 106, 108, 109, 113, and 115.

In the memory cell array 11_1, a plurality of insulating layers 101 and a plurality of wiring layers 102 are alternately stacked one by one. In the example of FIG. 6, the seven wiring layers 102 that function as the select gate line SGD, the word lines WL0 to WL4, and the select gate line SGD are stacked in order in the Z1-direction. Hereinafter, the wiring layers 102 that function as the word lines WL0, WL1, WL2, WL3, and WL4 are referred to as wiring layers 102_w0, 102_w1, 102_w2, 102_w3, and 102_w4, and the wiring layers 102 that function as the select gate lines SGD and SGS are referred to as wiring layers 102_d and 102_s.

For the insulating layer 101, silicon oxide (SiO) or the like can be used. The wiring layer 102 contains a conductive material. As the conductive material, a metal material, an n-type semiconductor, or a p-type semiconductor can be used. As the conductive material of the wiring layer 102, for example, a stacked structure of titanium nitride (TiN)/tungsten (W) is used. In such a case, TiN covers W. The wiring layer 102 may contain a high dielectric constant material, such as aluminum oxide (AlO) or the like. In such a case, the high dielectric constant material covers the conductive material.

The plurality of wiring layers 102 for each block BLK are separated by a slit SLT extending in the X-direction. The inside of the slit SLT is filled with the insulating layer 105. For the insulating layer 105, for example, SiO is used.

In the Z2-direction, the wiring layer 103 is provided above the wiring layer 102_s. The insulating layer 101 is provided between the wiring layer 102 and the wiring layer 103. The wiring layer 103 functions as the source line SL. In the Z2-direction, the wiring layer 104 is provided on the wiring layer 103. The wiring layer 104 is used as a wiring layer for electrically connecting the wiring layer 103 and the circuit chip 20. The wiring layers 103 and 104 contain a conductive material. As the conductive material, for example, a metal material, an n-type semiconductor, or a p-type semiconductor is used.

In the Z1-direction, the contact plug CP1 is provided on each wiring layer 102. The contact plug CP1 has, for example, a cylindrical shape. The contact plug CP1 includes the conductor 106 and the insulating layer 107. The conductor 106 has, for example, a cylindrical shape. One end of the conductor 106 is in contact with the wiring layer 102. The insulating layer 107 covers the side surface (i.e., the outer circumference) of the conductor 106. The insulating layer 107 has, for example, a cylindrical shape. The side surface of the conductor 106 is not electrically connected to the wiring layer 102 by the insulating layer 107. For the conductor 106, a metal material comprising Cu (copper), Al (aluminum), or the like can be used. For the insulating layer 107, for example, SiO is used.

In the example of FIG. 6, the contact plug CP1_w4 is provided. The contact plug CP1_w4 penetrates the wiring layer 102_d and is electrically connected to the wiring layer 102_w4.

The contact plug CP2 that penetrates the plurality of wiring layers 102 is provided. The contact plug CP2 has, for example, a cylindrical shape. The contact plug CP2 includes the conductor 109 and the insulating layer 110. The conductor 109 has, for example, a cylindrical shape. The insulating layer 110 covers the side surface (i.e., the outer circumference) of the conductor 109. The insulating layer 110 has, for example, a cylindrical shape. The conductor 109 is not electrically connected to the wiring layers 102 by the insulating layer 110.

The wiring layer 103 and the wiring layer 104 are not provided in the CP2 region in which the contact plug CP2 is provided. Then, in the Z2-direction, the conductor 108 is provided above the wiring layer 102_s. The insulating layer 101 is provided between the wiring layer 102 and the conductor 108. The conductor 108 is in contact with one end of the contact plug CP2.

In the Z1-direction, the wiring layer 111 is provided above the wiring layer 102_d. The wiring layer 111 extends in the Y-direction. The insulating layer 101 is provided between the wiring layer 102 and the wiring layer 111. The wiring layer 111 contains a conductive material. As the conductive material, a metal material such as copper, aluminum or the like can be used.

The lower end of the contact plug CP1 and the lower end of the contact plug CP2 in the adjacent block BLK in the Y-direction are connected to the wiring layer 111. The contact plugs CP1 and CP2 connected to the wiring layer 111 are disposed side by side along the Y-direction. In the example of FIG. 6, the contact plug CP1_w4 of the block BLK0 and the contact plug CP2_w4 of the block BLK1 are connected to the wiring layer 111 straddled the blocks BLK0 and BLK1. The contact plug CP1_w4 of the block BLK2 and the contact plug CP2_w4 of the block BLK3 are connected to the wiring layer 111 straddled the blocks BLK2 and BLK3.

In the Z1-direction, an insulating layer 112 is provided on the wiring layer 111 and the insulating layer 101. For the insulating layer 112, for example, SiO is used.

A plurality of conductors 113 are provided in the insulating layer 112. The conductor 113 functions as the electrode pad PD. For example, one conductor 113 is provided on one wiring layer 111. For the conductor 113, for example, a metal material comprising copper is used.

In the Z2-direction, the insulating layer 114 is provided on the wiring layer 104, the insulating layer 101, and the conductor 108. For the insulating layer 114, for example, SiO is used.

A plurality of conductors 115 are provided in the insulating layer 114. The conductor 115 functions as the electrode pad PD. For example, one conductor 115 is provided on one conductor 108. For the conductor 115, a metal material comprising copper is used.

Next, an internal configuration of the array chip 10_2 will be described. In the following, the features different from the array chip 10_1 will be mainly described.

In the array chip 10_2, the contact plug CP2, the conductor 108, the insulating layer 114, and the conductor 115 disposed in the array chip 10_1 are not disposed. The other configurations are the same as those of the array chip 10_1. The conductor 113 of the array chip 10_2 is connected to the conductor 115 of the array chip 10_1.

For example, the wiring layer 102 of the array chip 10_2 is electrically connected to the wiring layer 102 of the array chip 10_1 via the contact plug CP1 of the array chip 10_2, the wiring layer 111 of the array chip 10_2, the conductor 113 of the array chip 10_2, the conductor 115 of the array chip 10_1, the conductor 108 of the array chip 10_1, the contact plug CP2 of the array chip 10_1, the wiring layer 111 of the array chip 10_1, and the contact plug CP1 of the array chip 10_1.

In the example of FIG. 6, the wiring layer 102_w4 of the block BLK0 of the array chip 10_2 and the wiring layer 102_w4 of the block BLK0 of the array chip 10_1 are electrically connected to each other. In other words, the word line WL4 of the memory cell array 11_2 and the word line WL4 of the memory cell array 11_1 disposed upward in the Z1-direction are electrically connected to each other. In such a case, the contact plug CP1_w4 of the memory cell array 11_2 and the contact plug CP1_w4 of the memory cell array 11_1 disposed upward in the Z1-direction are electrically connected to each other. The same applies to the other word lines WLs. The contact plug CP2 and the conductor 108 may be provided in the memory cell array 11_2.

Next, the circuit chip 20 will be described.

The circuit chip 20 includes a plurality of transistors Tr and various wiring layers. The plurality of transistors Tr are used in the sequencer 21, the voltage generation circuit 22, the row driver 23, the row decoder 24, the sense amplifier 25, and the like.

More specifically, the circuit chip 20 includes a semiconductor substrate 200, insulating layers 201, 202, and 209, a gate electrode 203, conductors 204, 206, 208, and 210, and wiring layers 205 and 207.

An element isolation area is provided in the vicinity of the surface of the semiconductor substrate 200. The element isolation area electrically separates, for example, an n-type well region and a p-type well region provided in the vicinity of the surface of the semiconductor substrate 200. The inside of the element isolation area is filled with the insulating layer 201. For the insulating layer 201, for example, SiO is used.

The insulating layer 202 is provided on the semiconductor substrate 200. For the insulating layer 202, for example, SiO is used.

The transistor Tr includes a gate insulating film (not illustrated) provided on the semiconductor substrate 200, the gate electrode 203 provided on the gate insulating film, and source and drain electrodes formed on the semiconductor substrate 200. The source and drain electrodes are electrically connected to the wiring layer 205 via the conductor 204. The conductor 204 extends in the Z2-direction. The conductor 204 functions as a contact plug. The conductor 206 is provided on the wiring layer 205. The conductor 206 extends in the Z2-direction. The conductor 206 functions as the contact plug. The wiring layer 207 is provided on the conductor 206. The conductor 208 is provided on the wiring layer 207. The conductor 208 extends in the Z2-direction. The number of wiring layers provided on the circuit chip 20 is any number. The conductor 208 functions as the contact plug. The wiring layers 205 and 207 are made of a conductive material. For the conductors 204, 206, and 208, and the wiring layers 205 and 207, for example, a metal material, a p-type semiconductor, or an n-type semiconductor is used.

In the Z2-direction, the insulating layer 209 is provided on the insulating layer 202. For the insulating layer 209, for example, SiO is used.

A plurality of conductors 210 are provided in the insulating layer 209. The conductor 210 functions as the electrode pad PD. For example, one conductor 210 is provided on one conductor 208. For the conductor 210, a metal material such as copper can be used. The conductor 210 of the circuit chip 20 is connected to the conductor 113 of the array chip 10_1.

1.5.2 Configuration of B1-B2 Cross Section

Figure 7:
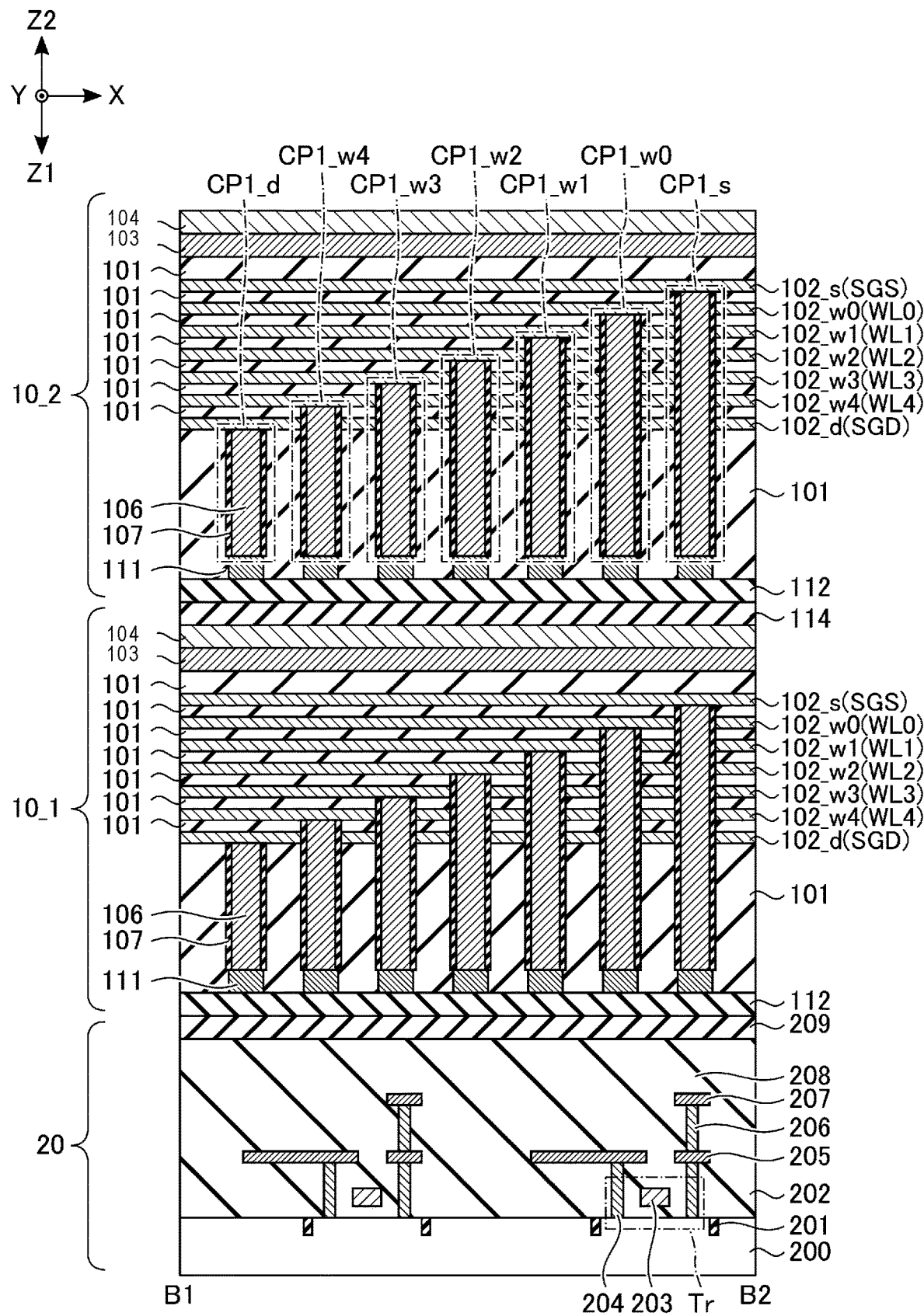
FIG. 7 is a cross-sectional view taken along line B1-B2 of FIGS. 4 and 5.

Next, an example of the configuration of the B1-B2 cross section of the semiconductor memory device 1 will be described with reference to FIG. 7. FIG. 7 is a cross-sectional view taken along line B1-B2 of FIGS. 4 and 5. In the following, the details of the configuration of the contact plug CP1 will be described.

As illustrated in FIG. 7, each of the array chips 10_1 and 10_2 comprises the contact plugs CP1_s, CP1_w0 to CP1_w4, and CP1_d. In the example of FIG. 7, the contact plugs CP1_s, CP1_w0 to CP1_w4, and CP1_d are disposed in order from the right side to the left side of FIG. 7. One end of each of the contact plugs CP1_s, CP1_w0 to CP1_w4, and CP1_$d$ is in contact with the wiring layers 102_$s$, 102_$w$0 to 102_$w$4, and 102_$d$, respectively. The other end of each of the contact plugs CP1_$s$, CP1_$w$0 to CP1_$w$4, and CP1_$d$ is in contact with different wiring layers 111. For that reason, lengths of the contact plugs CP1_$s$, CP1_$w$0 to CP1_$w$4, and CP1_$d$ in the Z-direction are different from each other.

More specifically, the contact plug CP1_$s$ penetrates six wiring layers 102_$w$0 to 102_$w$4 and 102_$d$. The contact plug CP1_$s$ is not electrically connected to the six wiring layers 102_$w$0 to 102_$w$4 and 102_$d$. Then, one end of the contact plug CP1_$s$ is electrically connected to the wiring layer 102_$s$.

The contact plug CP1_$w$0 penetrates five wiring layers 102_$w$1 to 102_$w$4 and 102_$d$. The contact plug CP1_$w$0 is not electrically connected to the five wiring layers 102_$w$1 to 102_$w$4 and 102_$d$. Then, one end of the contact plug CP1_$w$0 is electrically connected to the wiring layer 102_$w$0.

The contact plug CP1_$w$1 penetrates four wiring layers 102_$w$2 to 102_$w$4 and 102_$d$. The contact plug CP1_$w$1 is not electrically connected to the four wiring layers 102_$w$2 to 102_$w$4 and 102_$d$. Then, one end of the contact plug CP1_$w$1 is electrically connected to the wiring layer 102_$w$1.

The contact plug CP1_$w$2 penetrates three wiring layers 102_$w$3, 102_$w$4, and 102_$d$. The contact plug CP1_$w$2 is not electrically connected to the three wiring layers 102_$w$3, 102_$w$4, and 102_$d$. Then, one end of the contact plug CP1_$w$2 is electrically connected to the wiring layer 102_$w$2.

The contact plug CP1_$w$3 penetrates two wiring layers 102_$w$4 and 102_$d$. The contact plug CP1_$w$3 is not electrically connected to the two wiring layers 102_$w$4 and 102_$d$. Then, one end of the contact plug CP1_$w$3 is electrically connected to the wiring layer 102_$w$3.

The contact plug CP1_$w$4 penetrates the wiring layer 102_$d$. The contact plug CP1_$w$4 is not electrically connected to the wiring layer 102_$d$. Then, one end of the contact plug CP1_$w$4 is electrically connected to the wiring layer 102_$w$4.

One end of the contact plug CP1_$d$ is electrically connected to the wiring layer 102_$d$.

1.5.3 Configuration of C1-C2 Cross Section

Figure 8:
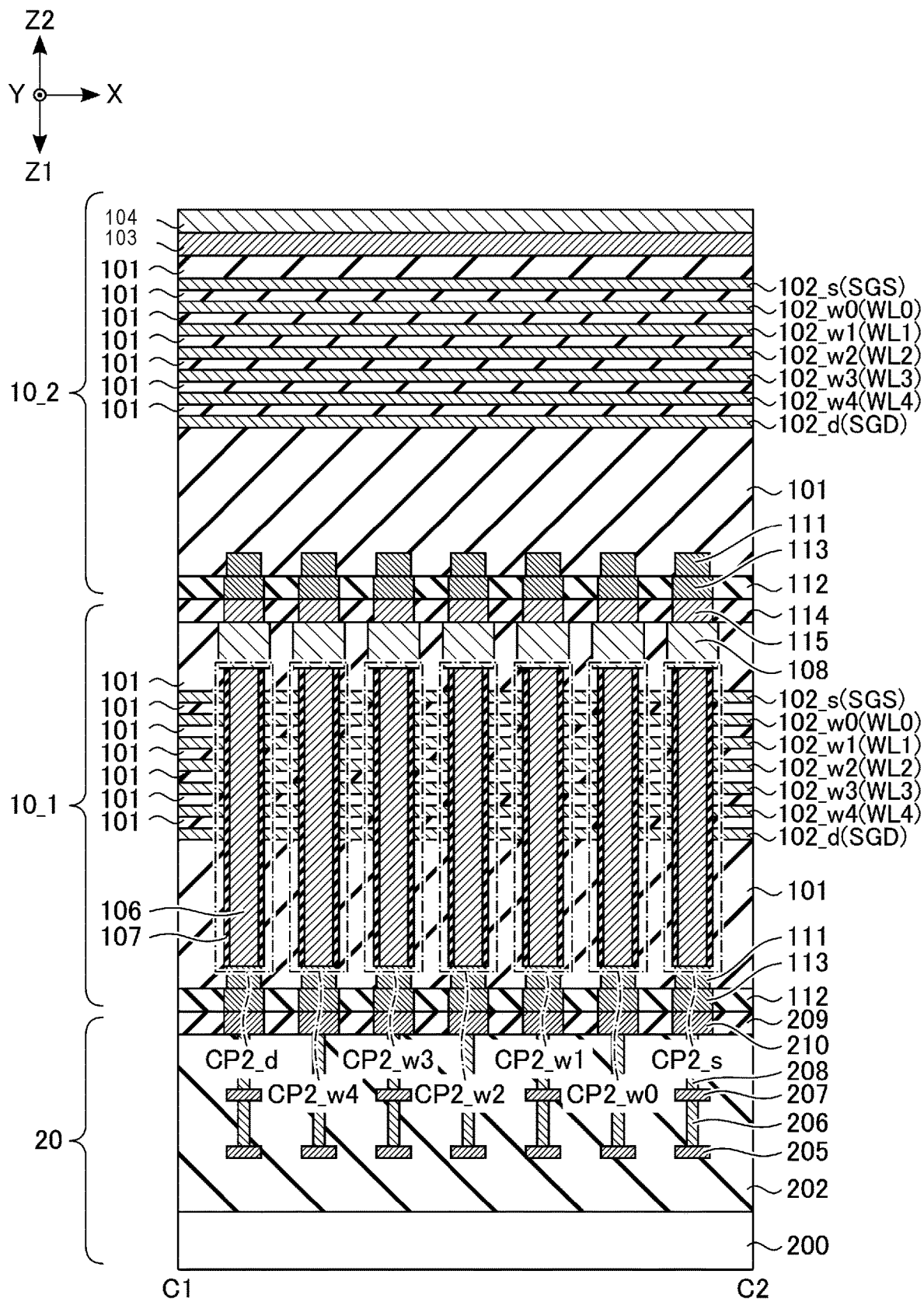
FIG. 8 is a cross-sectional view taken along line C1-C2 of FIGS. 4 and 5.

Next, an example of the configuration of the C1-C2 cross section of the semiconductor memory device 1 will be described with reference to FIG. 8. FIG. 8 is a cross-sectional view taken along line C1-C2 of FIGS. 4 and 5. In the following, the details of the configuration of the contact plug CP2_will be described.

As illustrated in FIG. 8, the array chip 10_1 comprises the contact plugs CP2_$s$, CP2_$w$0 to CP2_$w$4, and CP2_$d$. In the example of FIG. 8, the contact plugs CP2_$s$, CP2_$w$0 to CP2_$w$4, and CP2_$d$ are disposed in order from the right side to the left side of FIG. 8. The contact plugs CP2_$s$, CP2_$w$0 to CP2_$w$4, and CP2_$d$ have substantially the same shape and the same length in the Z1/Z2-direction. The contact plugs CP2_$s$, CP2_$w$0 to CP2_$w$4, and CP2_$d$ penetrate seven wiring layers 102_$s$, 102_$w$0 to 102_$w$4, and 102_$d$. The contact plugs CP2_$s$, CP2_$w$0 to CP2_$w$4, and CP2_$d$ are not electrically connected to the seven wiring layers 102_$s$, 102_$w$0 to 102_$w$4, and 102_$d$. One end of each of the contact plugs CP2_$s$, CP2_$w$0 to CP2_$w$4, and CP2_$d$ is connected to different conductors 108. The other end of each of the contact plugs CP2_$s$, CP2_$w$0 to CP2_$w$4, and CP2_$d$ is connected to different wiring layers 111.

1.5.4 Configuration of D1-D2 Cross Section

Figure 9:
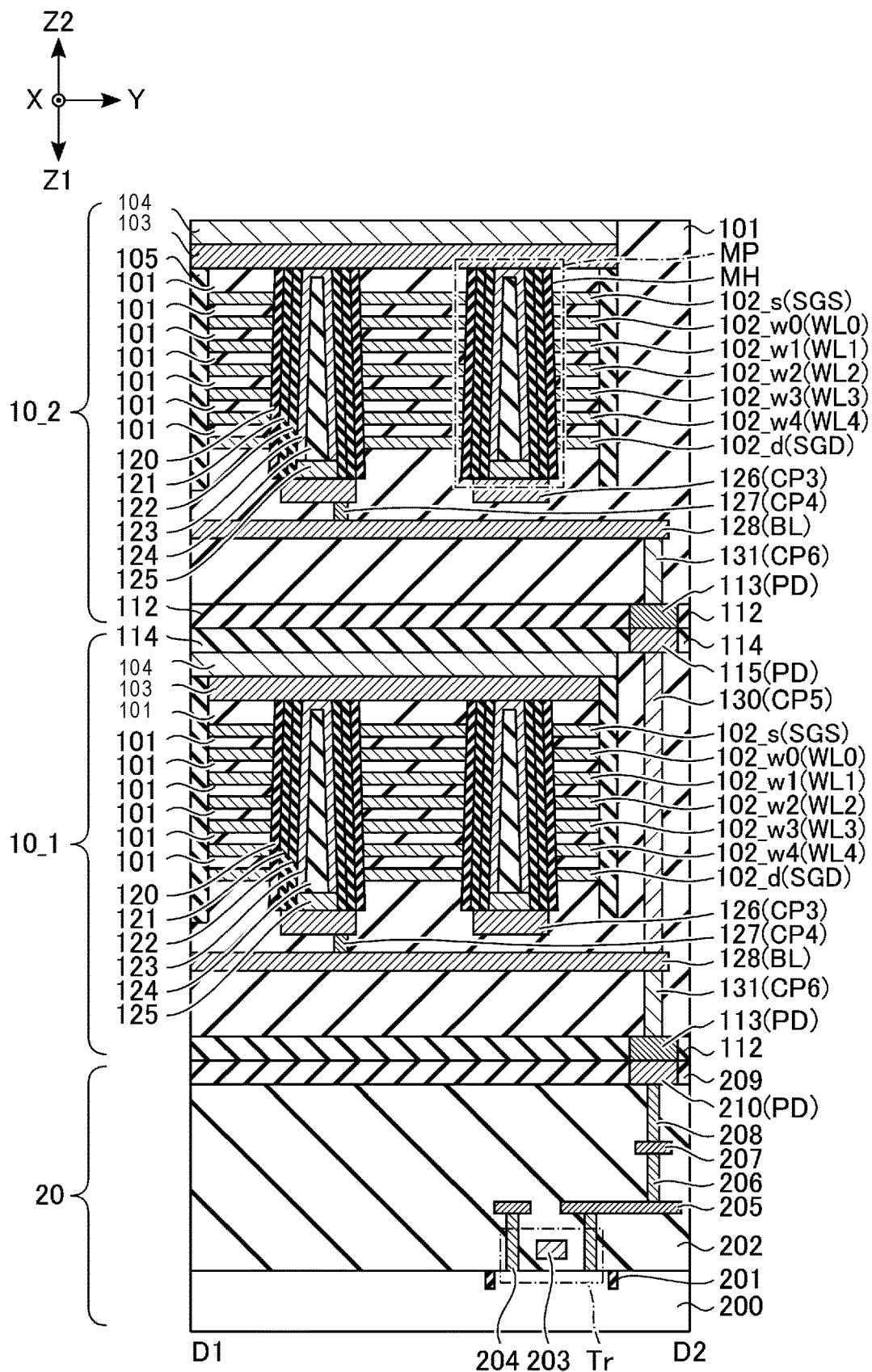
FIG. 9 is a cross-sectional view taken along line D1-D2 of FIGS. 4 and 5.

Next, an example of a configuration of D1-D2 cross section of the semiconductor memory device 1 will be described with reference to FIG. 9. FIG. 9 is a cross-sectional view taken along line D1-D2 of FIGS. 4 and 5. In the following, the details of the configuration of the memory pillar MP and the bit line BL will be described.

As illustrated in FIG. 9, each of the array chips 10_1 and 10_2 comprises the memory pillars MPs.

The memory pillar MP penetrates a plurality of wiring layers 102. The memory pillar MP extends in the Z-direction. One end of the memory pillar MP is in contact with the wiring layer 103. In the Z1-direction, a conductor 126 is provided on the other end of the memory pillar MP. The conductor 126 functions as a contact plug CP3. A conductor 127 is provided on the conductor 126. The conductor 127 functions as a contact plug CP4. In the Z1-direction, a plurality of wiring layers 128 are provided above the memory pillar MP. The plurality of wiring layers 128 are disposed side by side in the X-direction. The wiring layer 128 extends in the Y-direction. The wiring layer 128 functions as the bit line BL. The wiring layer 128 is connected to any of the memory pillars MPs via the contact plugs CP3 and CP4.

In the array chip 10_1, one end of the wiring layer 128 is connected to the conductor 115 via a conductor 130. Furthermore, the other end of the wiring layer 128 is connected to the conductor 113 via a conductor 131. The conductors 130 and 131 extend in the Y-direction. The conductors 130 and 131 function as contact plugs CP5 and CP6, respectively.

In the array chip 10_2, one end of the wiring layer 128 is connected to the conductor 113 via the conductor 131. Accordingly, the wiring layer 128 of the memory cell array 11_2 and the wiring layer 128 of the memory cell array 11_1 disposed upward in the Z1-direction are electrically connected to each other. In other words, the memory pillar MP of the memory cell array 11_2 and the memory pillar MP of the memory cell array 11_1 disposed upward in the Z1-direction are electrically connected to each other.

For the conductors 126, 127, 130, and 131, and the wiring layer 128, a metal material such as W, Al, or Cu is used.

Next, an internal configuration of the memory pillar MP will be described.

The memory pillar MP includes a block insulating film 120, a charge storage layer 121, a tunnel insulating film 122, a semiconductor layer 123 (also referred to as a semiconductor column 123 or a semiconductor portion 123), a core layer 124, and a cap layer 125.

More specifically, a hole MH that penetrates the plurality of wiring layers 102 is provided. The hole MH corresponds to the memory pillar MP. An end portion of the hole MH in the Z2-direction reaches the wiring layer 103. The block insulating film 120, the charge storage layer 121, and the tunnel insulating film 122 are stacked on the side surface of the hole MH in this order from the outside. For example, when the hole MH has a cylindrical shape, the block insulating film 120, the charge storage layer 121, and the tunnel insulating film 122 each have a cylindrical shape. The semiconductor layer 123 is in contact with the side surface of the tunnel insulating film 122. An end portion of the semiconductor layer 123 in the Z2-direction is in contact with the wiring layer 103. The semiconductor layer 123 is a region in which channels of the memory cell transistors MC and the select transistors ST1 and ST2 are formed. Therefore, the semiconductor layer 123 functions as a signal line connecting the current paths of the select transistor ST2, the memory cell transistors MC0 to MC4, and the select transistor ST1. The inside of the semiconductor layer 123 is filled with the core layer 124. The cap layer 125 whose side surface is in contact with the tunnel insulating film 122 is provided on the end portions of the semiconductor layer 123 and the core layer 124 in the Z1-direction. That is, the memory pillar MP includes the semiconductor layer 123 that passes through the inside of the plurality of wiring layers 102 and extends in the Z-direction. In one embodiment, the cap layer 125 may be omitted.

For the block insulating film 120, the tunnel insulating film 122, and the core layer 124, for example, SiO is used. For the charge storage layer 121, silicon nitride (SiN) can be used. For the semiconductor layer 123 and the cap layer 125, for example, polysilicon is used.

The memory cell transistors MC0 to MC4 are formed by the memory pillar MP and the wiring layers 102_w0 to 102_w4, respectively. Similarly, the select transistor ST1 is formed by the memory pillar MP and the wiring layer 102_d. The select transistor ST2 is formed by the memory pillar MP and the wiring layer 102_s.

1.6 Effect of this Embodiment

With the configuration according to this embodiment, a semiconductor memory device capable of preventing an increase in chip area may be provided. This effect will be described in detail.

For example, in order to highly integrate a semiconductor memory device, a method of stacking a plurality of array chips is known. When the word lines WL of each array chip are connected to the circuit chip separately, the number of word line WLs connected to the row decoder increases. For that reason, a circuit scale of the row decoder increases according to the number of array chips. In other words, the area of the circuit chip increases.

In contrast, according to this embodiment, the word lines WL can be shared by a plurality of array chips. Accordingly, even if the number of array chips, that is, the number of layers of the word lines WLs to be stacked increases, the increase in the number of word lines WLs connected to the row decoder can be prevented. With this configuration, an increase in the area of the circuit chip can be prevented.

Furthermore, according to this embodiment, the bit lines BL can also be shared by the plurality of array chips. Accordingly, even if the number of array chips increases, an increase in the number of bit lines BL connected to the sense amplifier can be prevented. With this configuration, an increase in the area of the circuit chip can be prevented.

Furthermore, according to this embodiment, the select gate line SGD can be independently controlled in a plurality of array chips. Accordingly, different string units SU of the plurality of array chips can be controlled independently.

2. Second Embodiment

Next, a second embodiment will be described. In the second embodiment, the connection of the bit lines BL and the select gate lines SGD to the memory cell arrays is different from that in the first embodiment. Hereinafter, the features different from those of the first embodiment will be mainly described.

2.1 Overall Configuration of Semiconductor Memory Device

First, an example of the overall configuration of the semiconductor memory device 1 will be described with reference to FIG. 10. The connections between the components of the semiconductor memory device 1 are illustrated by arrow lines in FIG. 10, but are not limited to those shown therein.

Figure 10:
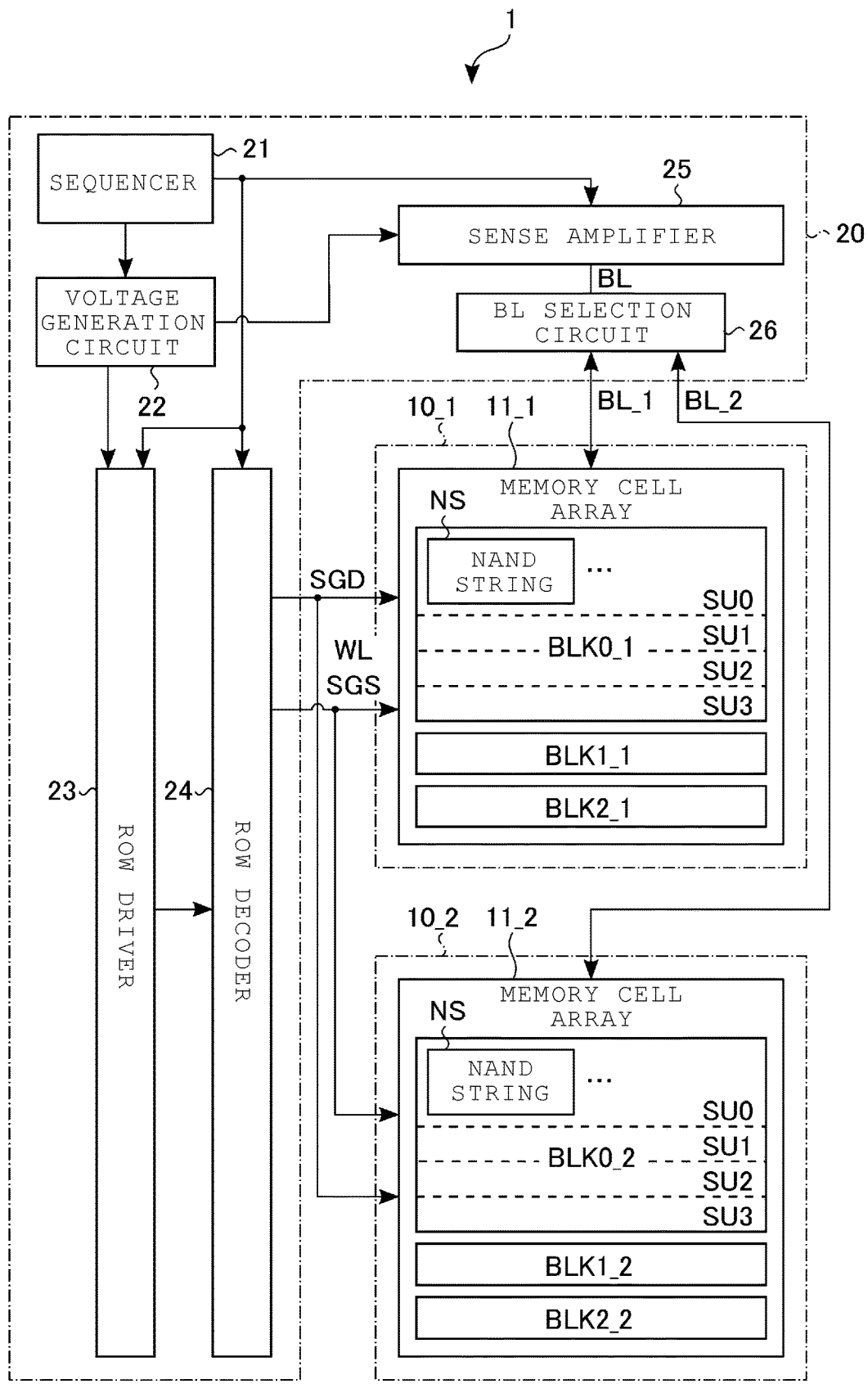
FIG. 10 is a block diagram illustrating a semiconductor memory device according to a second embodiment.

As illustrated in FIG. 10, the circuit chip 20 includes the sequencer 21, the voltage generation circuit 22, the row driver 23, the row decoder 24, the sense amplifier 25, and a BL selection circuit 26.

The configurations of the sequencer 21, the voltage generation circuit 22, the row driver 23, and the sense amplifier 25 are the same as those in the first embodiment.

In this embodiment, the word lines WL and the select gate lines SGD and SGS of the memory cell arrays 11_1 and 11_2 are connected in common to the row decoder 24. That is, the memory cell arrays 11_1 and 11_2 share the word lines WL and the select gate lines SGD and SGS.

The BL selection circuit 26 is a circuit that selects any of the memory cell array 11_1 and the memory cell array 11_2. Hereinafter, the bit lines BL connecting the BL selection circuit 26 and the memory cell array 11_1 are referred to as bit lines BL_1. The bit lines BL connecting the BL selection circuit 26 and the memory cell array 11_2 are referred to as bit lines BL_2.

The BL selection circuit 26 is connected to the sense amplifier 25 via a plurality of bit lines BL. The BL selection circuit 26 is connected to the memory cell array 11_1 via the bit lines BL_1. The BL selection circuit 26 is connected to the memory cell array 11_2 via the bit lines BL_2. The BL selection circuit 26 electrically connects the bit lines BL and any of the bit lines BL_1 and BL_2. In other words, the BL selection circuit 26 electrically connects the sense amplifier 25 and any of the memory cell arrays 11_1 and 11_2. The bit lines BL_1 and the bit lines BL_2 are not electrically connected to each other.

2.2 Circuit Configuration of Memory Cell Array and B1 Selection Circuit

Next, an example of the circuit configuration of the memory cell arrays 11_1 and 11_2 and the BL selection circuit 26 will be described with reference to FIG. 11.

Figure 11:
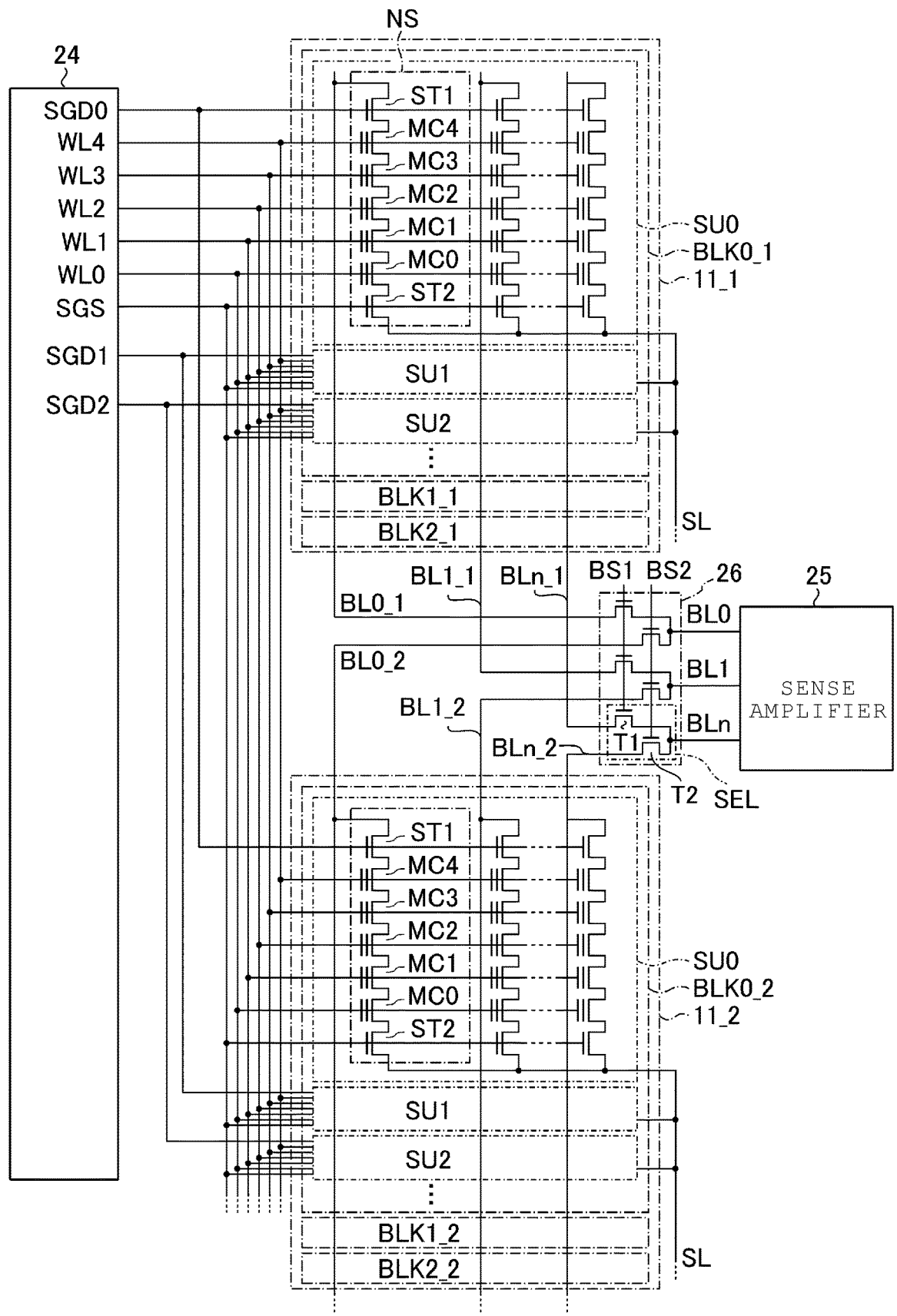
FIG. 11 is a circuit diagram of a memory cell array according to a second embodiment.

As illustrated in FIG. 11, the circuit configuration of the memory cell arrays 11_1 and 11_2 is the same as that in FIG. 2 of the first embodiment.

Similar to FIG. 2, the memory cell arrays 11_1 and 11_2 are connected in common to a single set of word lines WL. The memory cell arrays 11_1 and 11_2 are connected in common to one select gate line SGS.

In this embodiment, the gates of the plurality of select transistors ST1 of the string unit SU0 of the block BLK0_1 of the memory cell array 11_1 and the string unit SU0 of the block BLK0_2 of the memory cell array 11_2 are connected in common to a select gate line SGD0. The gates of the plurality of select transistors ST1 of the string unit SU1 of the block BLK0_1 of the memory cell array 11_1 and the string unit SU1 of the block BLK0_2 of the memory cell array 11_2 are connected in common to a select gate line SGD1. The gates of the plurality of select transistors ST1 of the string unit SU2 of the block BLK0_1 of the memory cell array 11_1 and the string unit SU2 of the block BLK0_2 of the memory cell array 11_2 are connected in common to a select gate line SGD2. That is, the memory cell arrays 11_1 and 11_2 are connected in common to one set of select gate lines SGD. The same applies to the blocks BLK1_1 and BLK1_2, and the blocks BLK2_1 and BLK2_2.

In the example of FIG. 11, the drains of (n+1) select transistors ST1 in the string unit SU of the memory cell array 11_1 are connected to (n+1) bit lines BL0_1 to BLn_1. The drains of (n+1) select transistors ST1 in the string unit SU of the memory cell array 11_2 are connected to (n+1) bit lines BL0_2 to BLn_2.

The BL selection circuit 26 includes a plurality of selectors SELs. One selector SEL is provided for a single bit line BL. That is, each of the bit lines BL, BL_1, and BL_2 is connected to one selector SEL. The selector SEL electrically connects the bit line BL and any of the bit lines BL_1 and the bit lines BL_2 based on control signals BS1 and BS2. In other words, the selector SEL electrically connects the sense amplifier 25 and any of the memory cell arrays 11_1 and 11_2 based on the control signals BS1 and BS2. The control signals BS1 and BS2 are supplied from, for example, the sequencer 21.

An internal configuration of the selector SEL will be described. In the following description, one of the source and drain of a transistor will be referred to as one end of the transistor. The other of the source and the drain of the transistor is referred to as the other end of the transistor.

The selector SEL includes transistors T1 and T2. One end of the transistor T1 and one end of the transistor T2 are connected in common to one of the bit lines BL. The other end of the transistor T1 is connected to one of the bit lines BL_1. The control signal BS1 is input to a gate of the transistor T1. The other end of the transistor T2 is connected to one of the bit lines BL_2. The control signal BS2 is input to a gate of the transistor T2. For example, when the control signal BS1 is at a High ("H") level, the transistor T1 is turned ON. For example, when the control signal BS2 is at the "H" level, the transistor T2 is turned ON.

More specifically, for example, in the case of the selector SEL corresponding to a bit line BL0, one end of the transistor T1 and one end of the transistor T2 are connected to the bit line BL0. The other end of the transistor T1 is connected to a bit line BL0_1. The other end of the transistor T2 is connected to a bit line BL0_2. The same applies to the selectors SELs corresponding to the other bit lines BL1 to BLn. In this state, for example, when the control signal BS1 is at the "H" level and the control signal BS2 is at the Low ("L") level, the bit lines BL0 to BLn are electrically connected to the bit lines BL0_1 to BLn 1 via the selectors SELs, respectively. For example, when the control signal BS1 is at the "L" level and the control signal BS2 is at the "H" level, the bit lines BL0 to BLn are electrically connected to the bit lines BL0_2 to BLn_2 via the selectors SELs, respectively.

2.3 Connection of Various Wirings Between Chips

Figure 12:
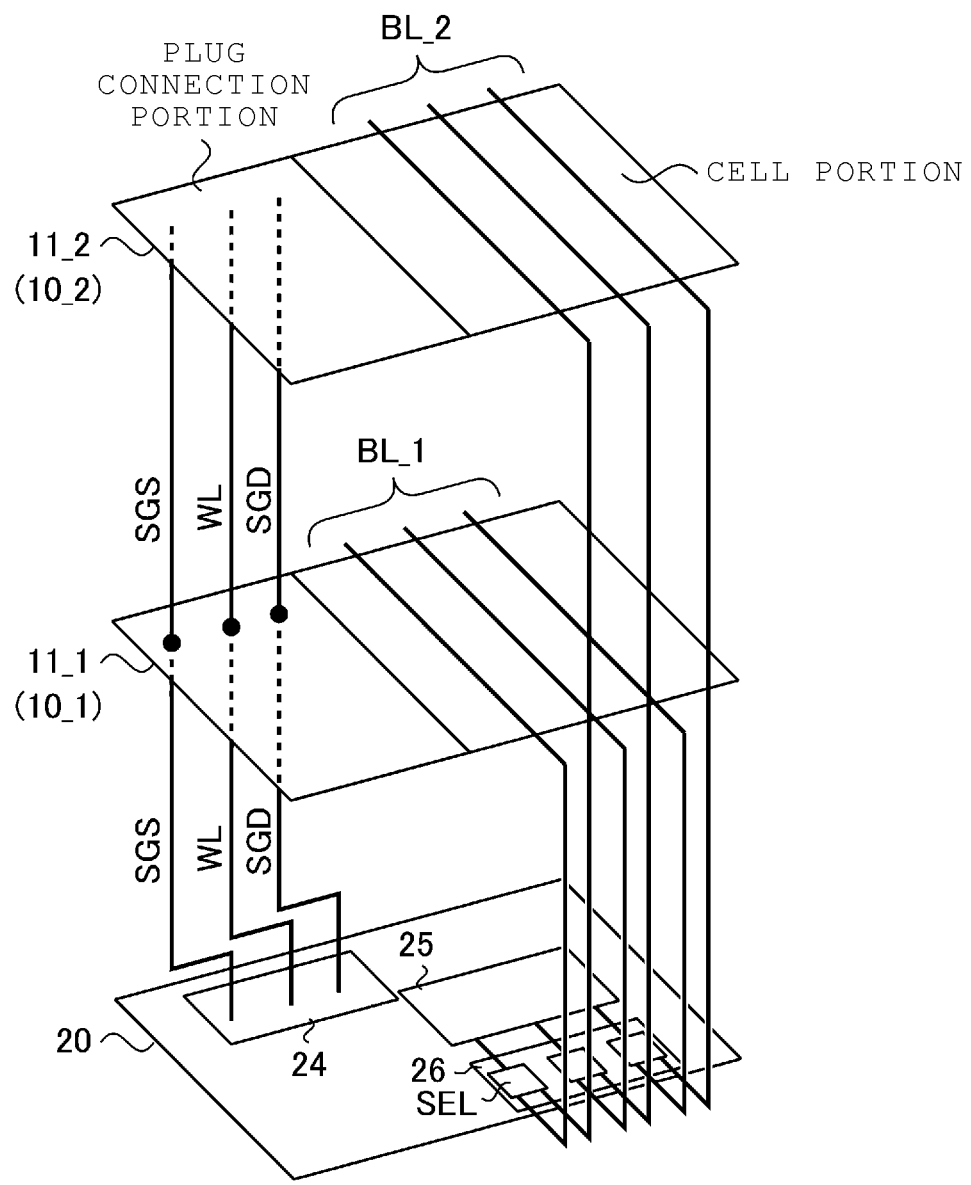
FIG. 12 is a conceptual diagram illustrating an arrangement of a memory cell array and a circuit chip according to a second embodiment.

Next, the connection of various wirings between the chips will be described with reference to FIG. 12. FIG. 12 is a conceptual diagram illustrating the arrangement of the memory cell arrays 11_1 and 11_2 and the circuit chip 20.

As illustrated in FIG. 12, the bit lines BL_1 of the memory cell array 11_1 and the bit lines BL_2 of the memory cell array 11_2 are connected to the BL selection circuit 26 of the circuit chip 20.

The word lines WL of the memory cell arrays 11_1 and 11_2 and the select gate lines SGD and SGS are connected in common to the row decoder 24 of the circuit chip 20.

2.4 Effect of This Embodiment

According to this embodiment, the same effect as that of the first embodiment can be obtained.

Furthermore, according to this embodiment, the semiconductor memory device 1 includes the BL selection circuit 26. By selecting the bit lines BL, that is, the array chips using the BL selection circuit 26, an increase in the number of bit lines BL connected to the sense amplifier can be prevented even if the number of array chips increases. With this configuration, an increase in the area of the circuit chip can be prevented.

Furthermore, according to this embodiment, the select gate lines SGD can be shared among a plurality of array chips. Accordingly, even if the number of array chips, that is, the number of string units SU increases, an increase in the number of select gate lines SGD connected to the row decoder can be prevented. With this configuration, an increase in the area of the circuit chip can be prevented.

3. Third Embodiment

Next, a third embodiment will be described. In the third embodiment, the connection of the bit lines BL and the select gate lines SGD to the memory cell arrays is different from those of the first and second embodiments. Hereinafter, the features different from the first and second embodiments will be mainly described.

3.1 Overall Configuration of Semiconductor Memory Device

Figure 13:
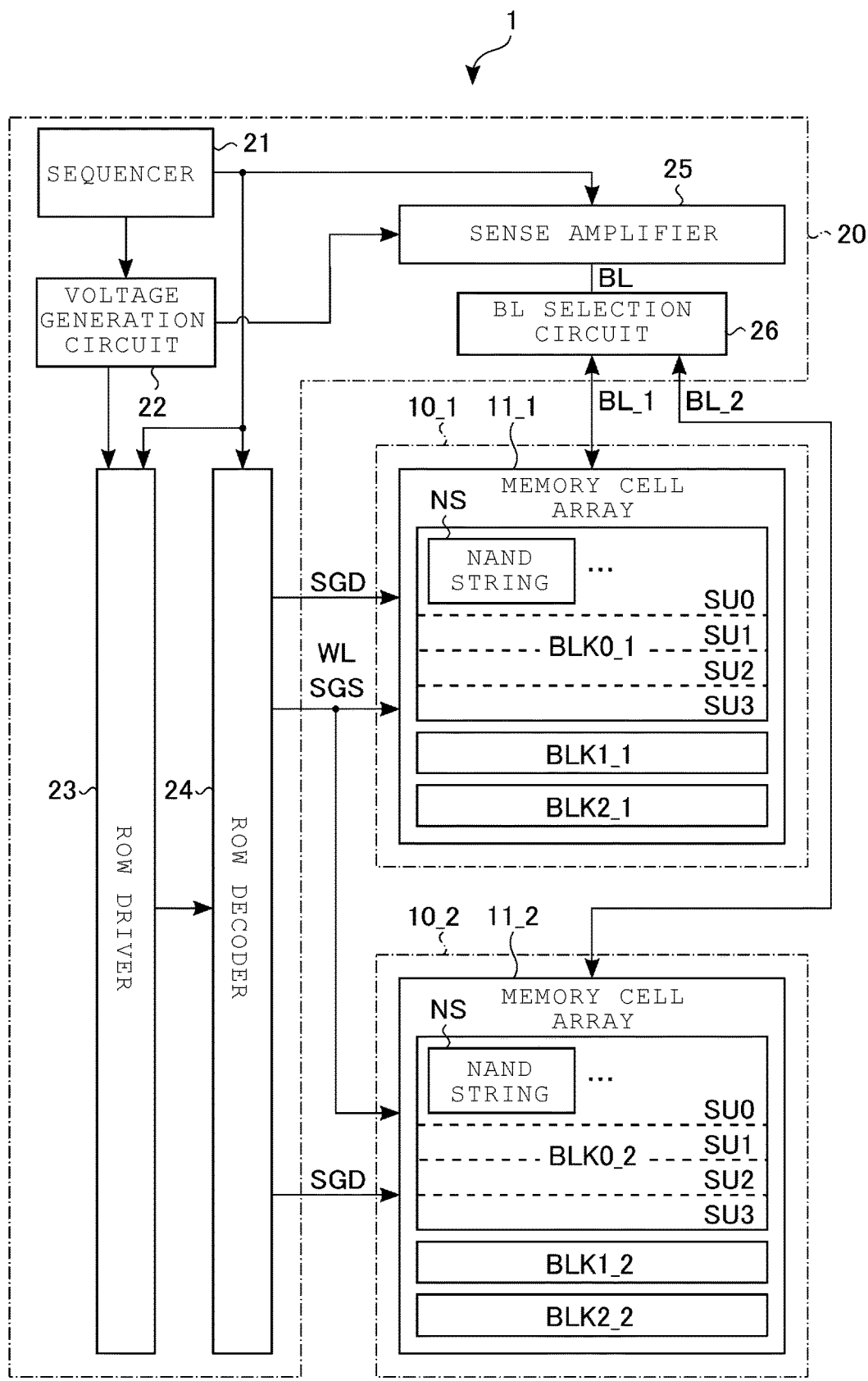
FIG. 13 is a block diagram illustrating a semiconductor memory device according to a third embodiment.

First, an example of the overall configuration of the semiconductor memory device 1 will be described with reference to FIG. 13. In FIG. 13, the connections between the components of the semiconductor memory device 1 are illustrated by arrow lines, but are not limited those shown therein.

As illustrated in FIG. 13, similar to FIG. 2 of the first embodiment, the word lines WL and the select gate line SGS of the memory cell arrays 11_1 and 11_2 are connected in common to the row decoder 24. In other words, the memory cell arrays 11_1 and 11_2 share the word lines WL and the select gate line SGS. Then, the select gate line SGD of the memory cell array 11_1 and the select gate line SGD of the memory cell array 11_2 are independently connected to the row decoder 24.

Similar to FIG. 10 of the second embodiment, the circuit chip 20 comprises the BL selection circuit 26. The BL selection circuit 26 electrically connects the sense amplifier 25 and any of the memory cell arrays 11_1 or 11_2.

3.2 Circuit Configuration of Memory Cell Array and B1 Selection Circuit

Next, an example of the circuit configuration of the memory cell arrays 11_1 and 11_2 and the BL selection circuit 26 will be described with reference to FIG. 14.

Figure 14:
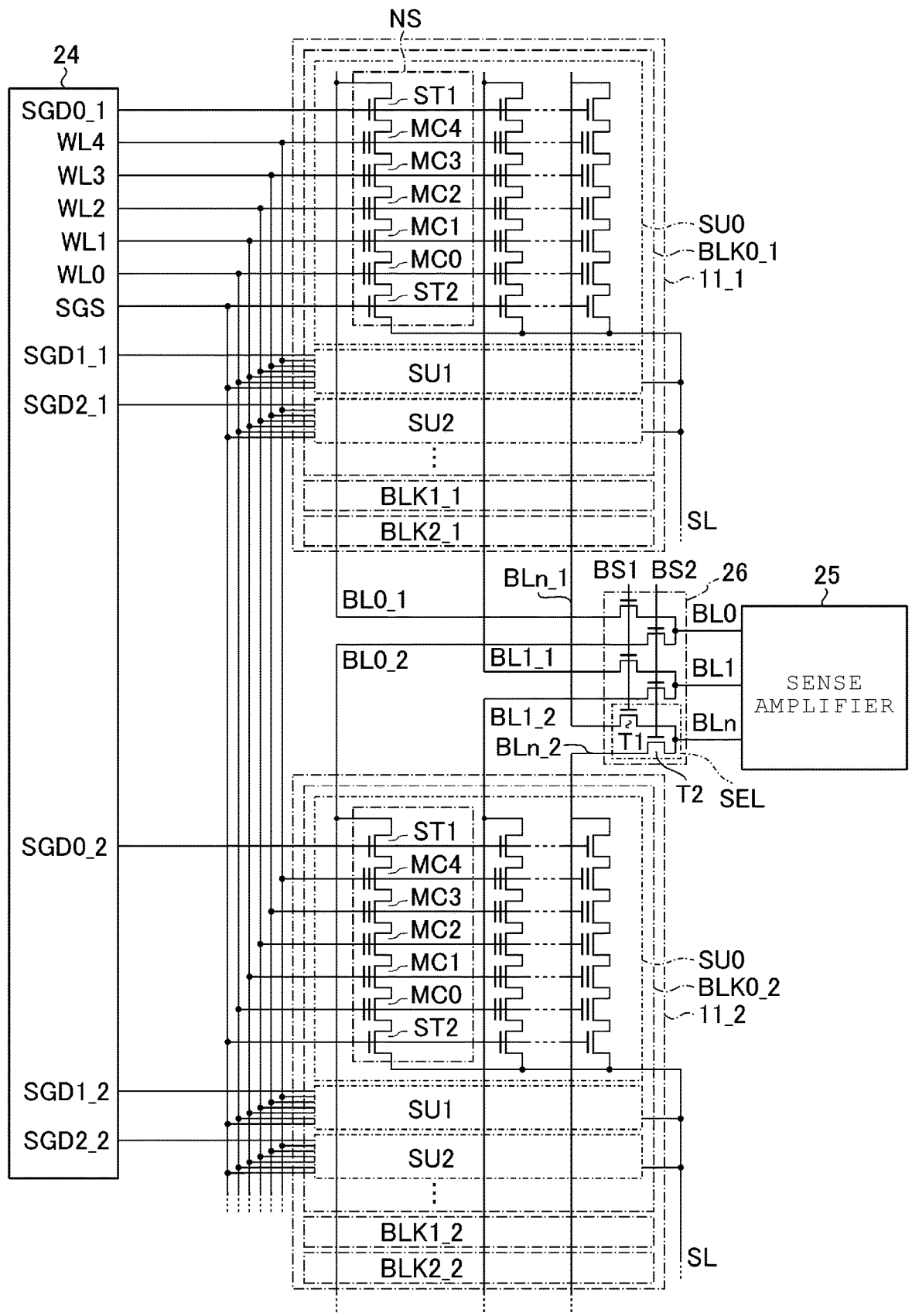
FIG. 14 is a circuit diagram of a memory cell array and a bit line (BL) selection circuit according to a third embodiment.

As illustrated in FIG. 14, similar to FIG. 2 of the first embodiment, the gates of the plurality of select transistors ST1 in the string unit SU are connected in common to one select gate line SGD. More specifically, the gates of the plurality of select transistors ST1 in the string unit SU0 of the memory cell array 11_1 are connected in common to the select gate line SGD0_1. The same applies to the other string units SU.

Figure 15:
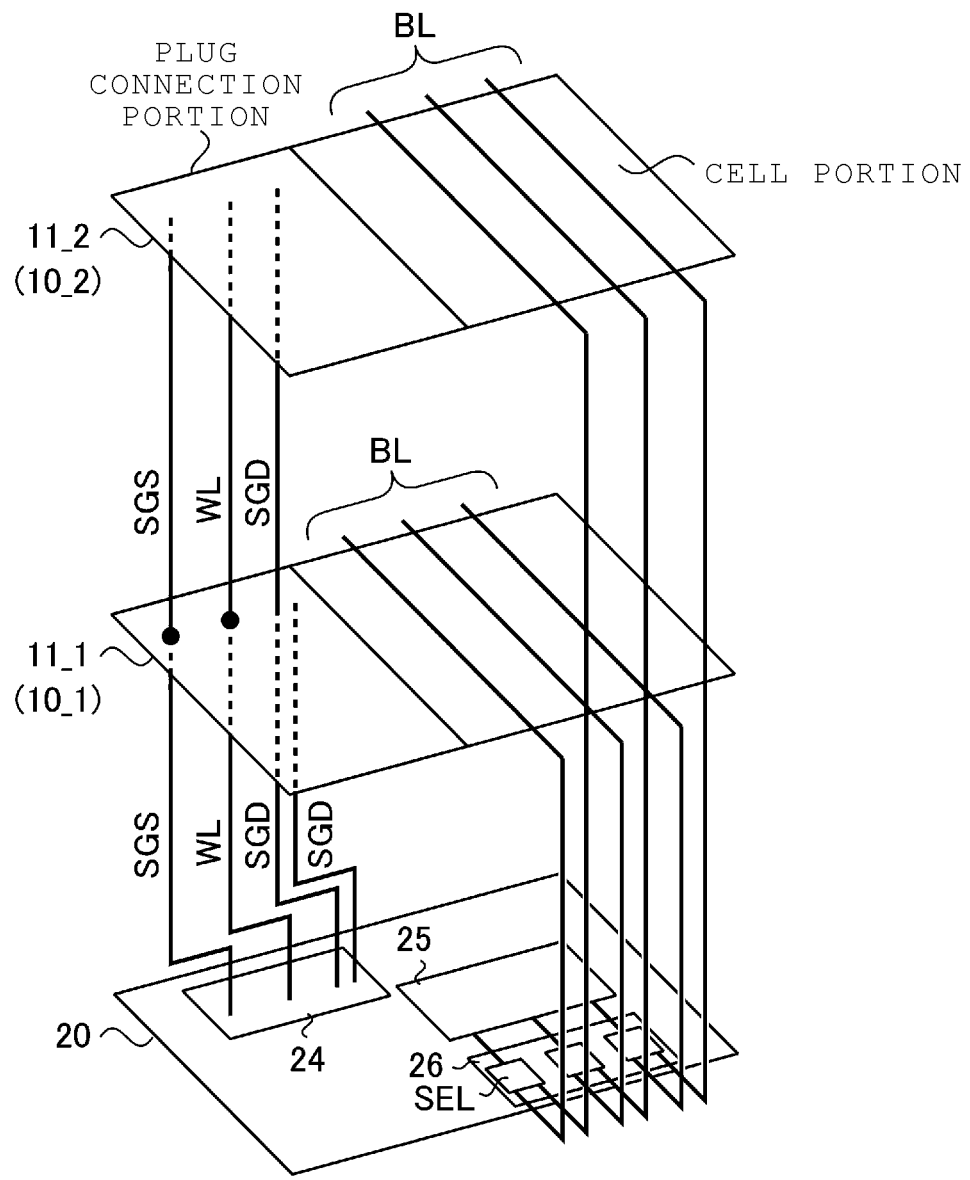
FIG. 15 depicts an arrangement of a memory cell array and a circuit chip according to a third embodiment.

The configuration of the bit lines BL, BL_1, BL_2, and the BL selection circuit 26 is the same as that in FIG. 11 of the second embodiment. 3.3 Connection of various wirings between chips Next, the connection of various wirings between the chips will be described with reference to FIG. 15. FIG. 15 is a conceptual diagram illustrating the arrangement of the memory cell arrays 11_1 and 11_2 and the circuit chip 20.

As illustrated in FIG. 15, the bit lines BL_1 of the memory cell array 11_1 and the bit lines BL_2 of the memory cell array 11_2 are connected to the BL selection circuit 26 of the circuit chip 20.

The word lines WL and the select gate line SGS of the memory cell arrays 11_1 and 11_2 are connected in common to the row decoder 24 of the circuit chip 20.

The select gate lines SGD of the memory cell array 11_1 are connected to the row decoder 24 of the circuit chip 20. The select gate lines SGD of the memory cell array 11_2 are connected to the row decoder 24 of the circuit chip 20. The select gate lines SGD of the memory cell array 11_1 and the select gate lines SGD of the memory cell array 11_2 are not electrically connected to each other.

3.4 Effect of This Embodiment

According to this embodiment, the same effects as those of the first and second embodiments can be obtained.

4. Fourth Embodiment

Next, a fourth embodiment will be described. In the fourth embodiment, four examples of a layout of the bit lines BL will be described. Hereinafter, the features different from those of the first to third embodiments will be mainly described. In the following description, for simplification of the description, when bit lines BL are expressed, the bit lines BL includes the wiring layer 128, various wiring layers connecting the wiring layer 128 and the sense amplifier 25 or the BL selection circuit 26, a contact plug, an electrode pad, and the like.

4.1 First Example

Figure 16:
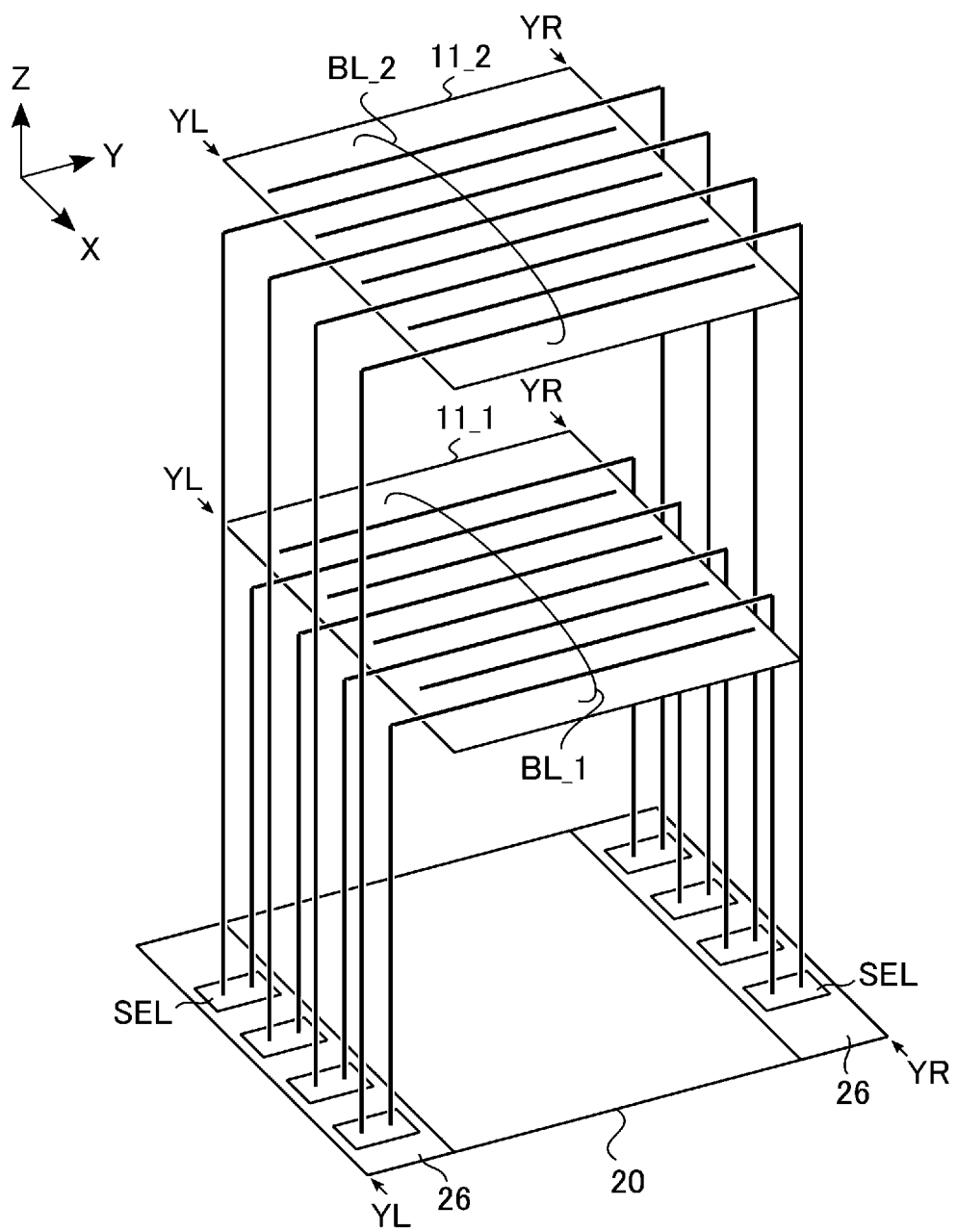
FIG. 16 depicts a circuit chip and a core portion of a memory cell array according to a first example of a fourth embodiment in perspective view.
Figure 17:
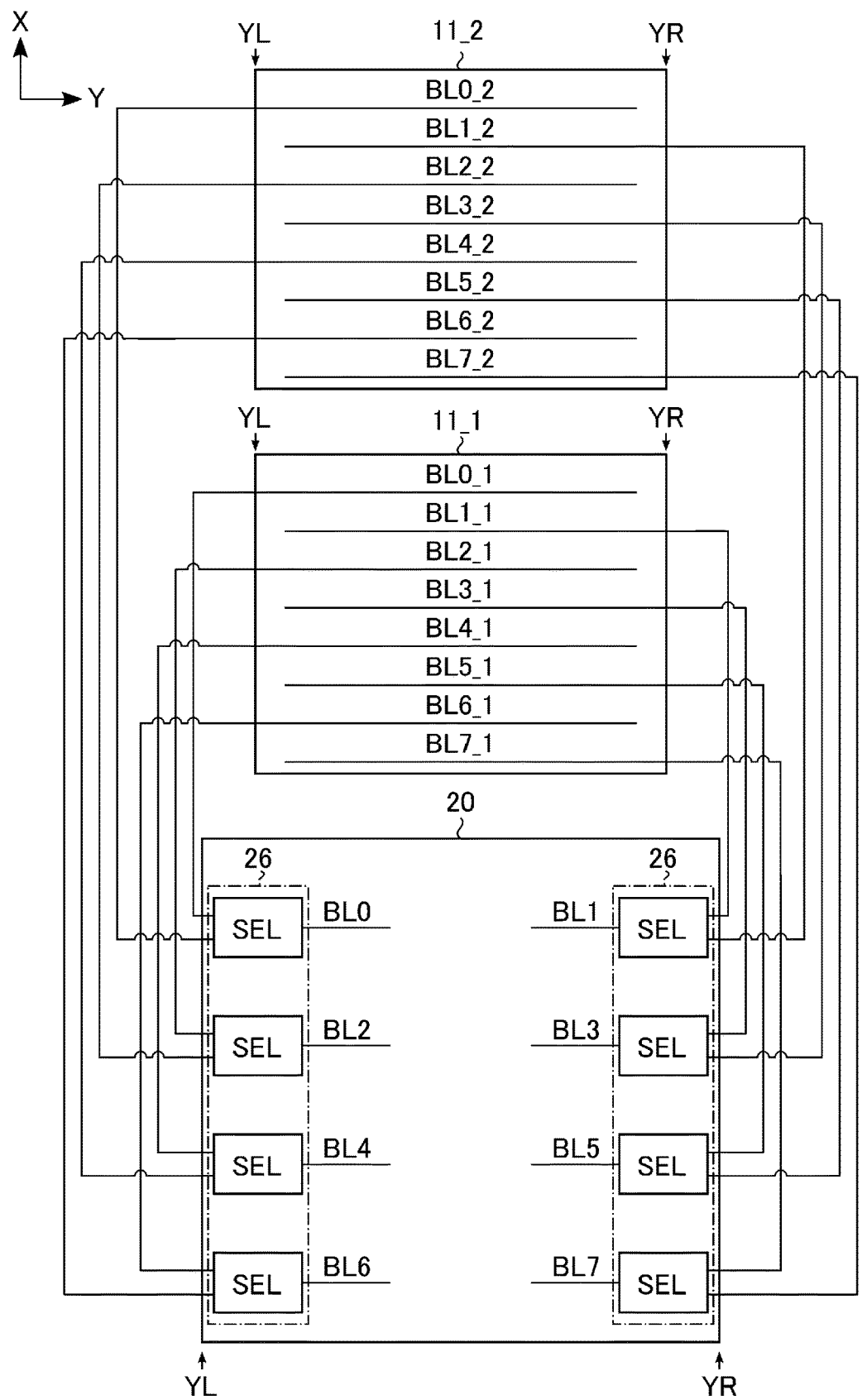
FIG. 17 depicts a circuit chip and a core portion of a memory cell array according to a first example of a fourth embodiment in a plane.

First, a first example will be described with reference to FIGS. 16 and 17. In the first example, a layout of the bit lines BL applicable to the second and third embodiments will be described. FIG. 16 is a conceptual diagram illustrating the circuit chip 20, the core portion of the memory cell array 11_1, and the core portion of the memory cell array 11_2 in perspective view. FIG. 17 is a conceptual diagram illustrating the circuit chip 20, the core portion of the memory cell array 11_1, and the core portion of the memory cell array 11_2 in a plane. In FIGS. 16 and 17, elements other than the bit lines BL and the BL selection circuit 26 are not illustrated for simplicity. Hereinafter, one end portion in the Y-direction of each of the memory cell arrays 11_1 and 11_2 and the circuit chip 20 is referred to as an end portion YL. The other end portion in the Y-direction thereof is referred to as end portion YR. The end portion YL and the end portion YR face each other in the Y-direction.

As illustrated in FIG. 16, the bit lines BL_1 of the memory cell array 11_1 and the bit lines BL_2 of the memory cell array 11_2 are not electrically connected to each other. That is, the memory cell array 11_1 and the memory cell array 11_2 do not share the bit lines BL. The plurality of bit lines BL_1 of the memory cell array 11_1 are alternately drawn out for every single bit line to the end portion YL side and the end portion YR side. The same applies to the plurality of bit lines BL_2 of the memory cell array 11_2. In the circuit chip 20, the BL selection circuits 26 are disposed at both ends in the Y-direction, that is, in the vicinity of the end portion YL and the end portion YR. Then, the bit lines BL_1 of the memory cell array 11_1 and the bit lines BL_2 of the memory cell array 11_2 are connected to the selectors SELs in the BL selection circuit 26. The selectors SELs are preferably disposed below the corresponding bit lines BL_1 and BL_2. With this configuration, the lengths of the respective bit lines BL_1 can be made approximately equal to each other. Similarly, the lengths of the respective bit lines BL_2 can be made approximately equal to each other.

More specifically, as illustrated in FIG. 17, for example, in the memory cell array 11_1, the even-numbered bit lines BL0_1, BL2_1, BL4_1, and BL6_1 are drawn out to the end portion YL side (i.e., the left side of the paper surface) of the memory cell array 11_1. For example, the odd-numbered bit lines BL1_1, BL3_1, BL5_1, and BL7_1 are drawn out to the end portion YR side (i.e., the right side of the paper surface) of the memory cell array 11_1.

Similarly, in the memory cell array 11_2, the even-numbered bit lines BL0_2, BL2_2, BL4_2, and BL6_2 are drawn out to the end portion YL side of the memory cell array 11_2. For example, the odd-numbered bit lines BL1_2, BL3_2, BL5_2, and BL7_2 are drawn out to the end portion YR side of the memory cell array 11_2.

In the circuit chip 20, the BL selection circuit 26 corresponding to the even-numbered bit lines BL is disposed on the end portion YL side of the circuit chip 20. The BL selection circuit 26 corresponding to the odd-numbered bit lines BL is disposed on the end portion YR side of the circuit chip 20.

The bit lines BL0_1 and BL0_2 are connected to the selector SEL to which the bit line BL0 on the end portion YL side is connected. The bit lines BL2_1 and BL2_2 are connected to the selector SEL to which a bit line BL2 is connected. The bit lines BL4_1 and BL4_2 are connected to the selector SEL to which a bit line BL4 is connected. The bit lines BL6_1 and BL6_2 are connected to the selector SEL to which a bit line BL6 is connected.

The bit lines BL1_1 and BL1_2 are connected to the selector SEL to which a bit line BL1 on the end portion YR side is connected. The bit lines BL3_1 and BL3_2 are connected to the selector SEL to which a bit line BL3 is connected. The bit lines BL5_1 and BL5_2 are connected to the selector SEL to which a bit line BL5 is connected. The bit lines BL7_1 and BL7_2 are connected to the selector SEL to which a bit line BL7 is connected.

In this example, a case where a plurality of bit lines BL_1 are alternately drawn out to the end portion YL side and the end portion YR side for every single bit line is described. However, the configuration is not limited thereto. For example, the plurality of bit lines BL_1 may be alternately drawn out for every two or more bit lines. The same applies to the bit line BL_2.

4.2 Second Example

Figure 18:
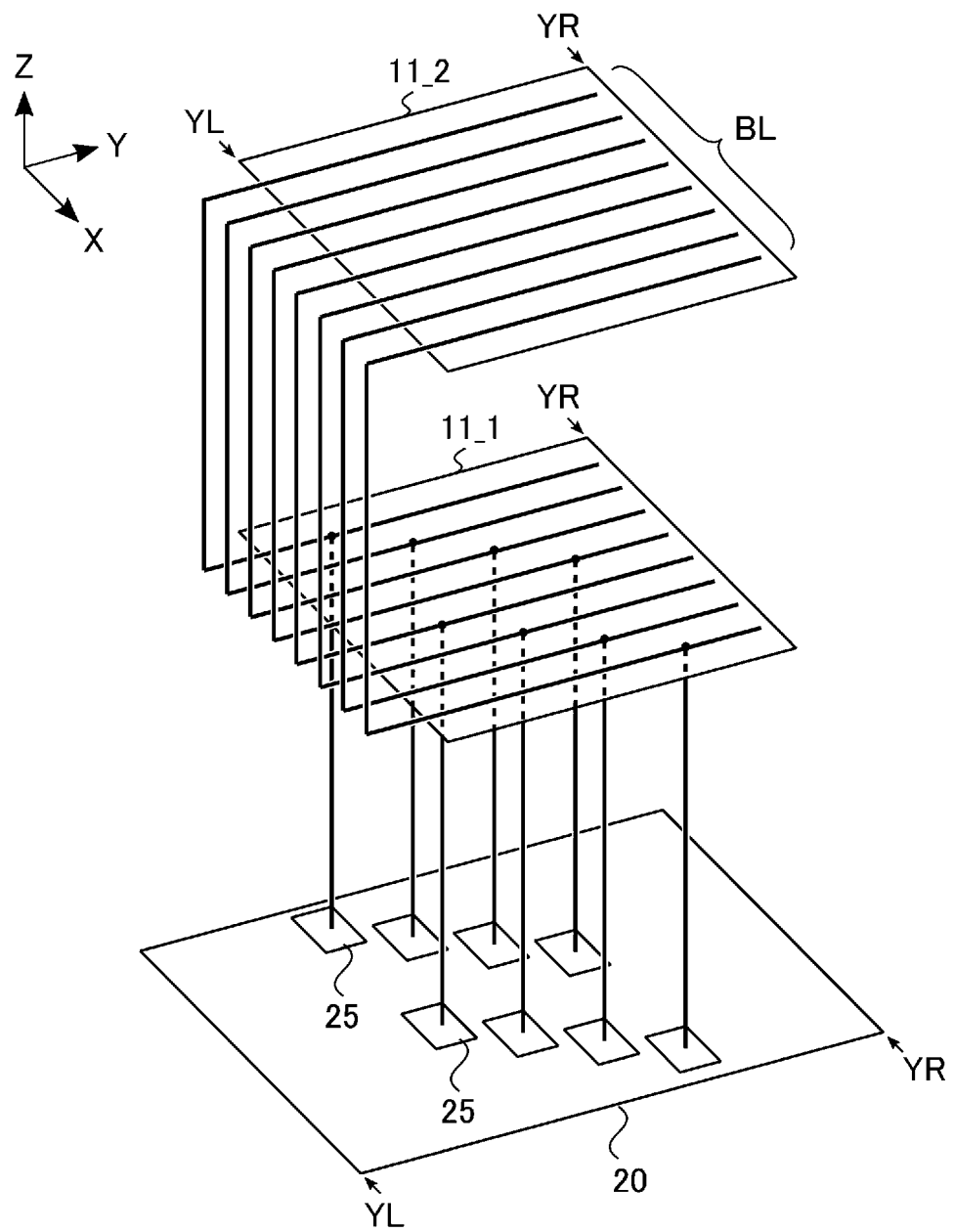
FIG. 18 depicts a circuit chip and a core portion of a memory cell array according to a second example of a fourth embodiment in perspective view.
Figure 19:
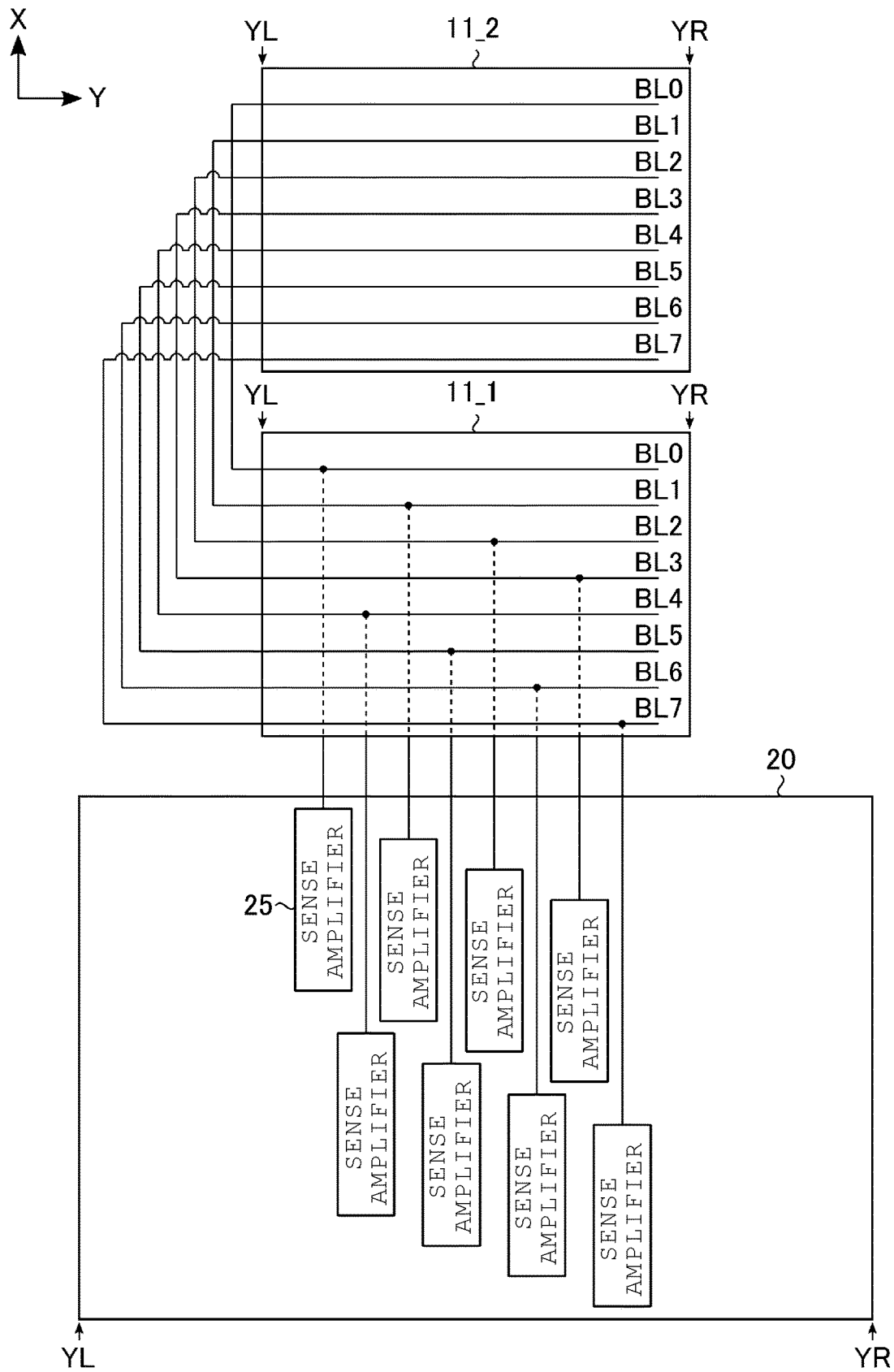
FIG. 19 depicts a circuit chip and a core portion of a memory cell array according to a second example of a fourth embodiment in a plane.

Next, a second example will be described with reference to FIGS. 18 and 19. In the second example, the layout of the bit lines BL applicable to the first embodiment will be described. FIG. 18 is a conceptual diagram illustrating the circuit chip 20, the core portion of the memory cell array 11_1, and the core portion of the memory cell array 11_2 in perspective view. FIG. 19 is a conceptual diagram illustrating the circuit chip 20, the core portion of the memory cell array 11_1, and the core portion of the memory cell array 11_2 in a plane. In FIGS. 18 and 19, elements other than the bit lines BL and the sense amplifier 25 are not illustrated for simplicity.

As illustrated in FIG. 18, the memory cell array 11_1 and the memory cell array 11_2 share the bit lines BL. That is, the bit lines BL of the memory cell array 11_1 and the bit lines BL of the memory cell array 11_2 are electrically connected to each other. In the memory cell array 11_1 and 11_2, the bit lines BL are drawn out to the end portion YL side. Then, on the end portion YL side, the bit lines BL of the memory cell array 11_2 and the bit lines BL of the memory cell array 11_1 are electrically connected to each other.

In this example, in the memory cell array 11_1 and 11_2, all the bit lines BL are drawn out to the end portion YL side. However, the configuration is not limited thereto. For example, the bit lines BL may be alternately drawn out for every single bit line to the end portion YL side and the end portion YR side.

In the circuit chip 20, the sense amplifier 25 is independently disposed for every single bit line BL. The arrangement of each sense amplifier 25 on the circuit chip may be freely designed. The sense amplifier 25 is preferably disposed below the corresponding bit line BL in the Z-direction in order to minimize a wiring length of the bit line BL. The bit line BL disposed in the memory cell array 11_1 is connected to the corresponding sense amplifier 25. In such a case, in the memory cell array 11_1, a connection portion to each sense amplifier 25 may be provided in the intermediate portion of the corresponding bit line BL so that the wiring length of a portion the bit line BL between the memory cell array 11_1 and the sense amplifier 25 is minimized.

More specifically, as illustrated in FIG. 19, for example, in the memory cell arrays 11_1 and 11_2, the bit lines BL0 to BL7 are drawn out to the end portion YL side. Then, on the end portion YL side, the bit lines BL0 to BL7 of the memory cell array 11_1 and the bit lines BL0 to BL7 of the memory cell array 11_2 are connected to each other, respectively. In the circuit chip 20, eight sense amplifiers 25 are disposed, for example, in the vicinity of the center of the circuit chip 20. The eight sense amplifiers 25 correspond to bit lines BL0 to BL7. The eight sense amplifiers 25 are disposed below the corresponding bit lines BL in the Z-direction. In the memory cell array 11_1, the connection portion to each sense amplifier 25 is provided in the intermediate portion of the corresponding bit line BL.

4.3 Third Example

Figure 20:
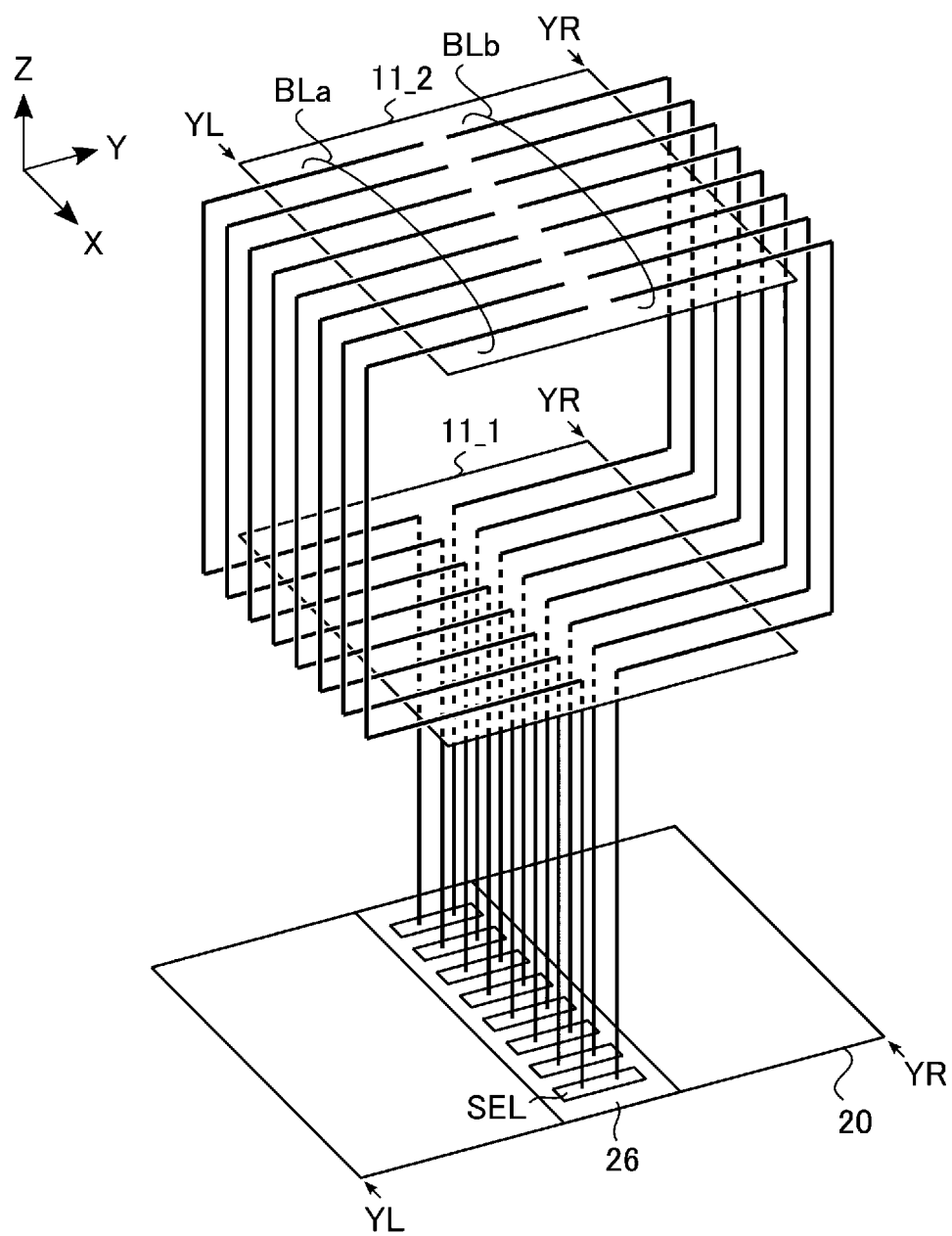
FIG. 20 depicts a circuit chip and a core portion of a memory cell array according to a third example of a fourth embodiment in a plane.
Figure 21:
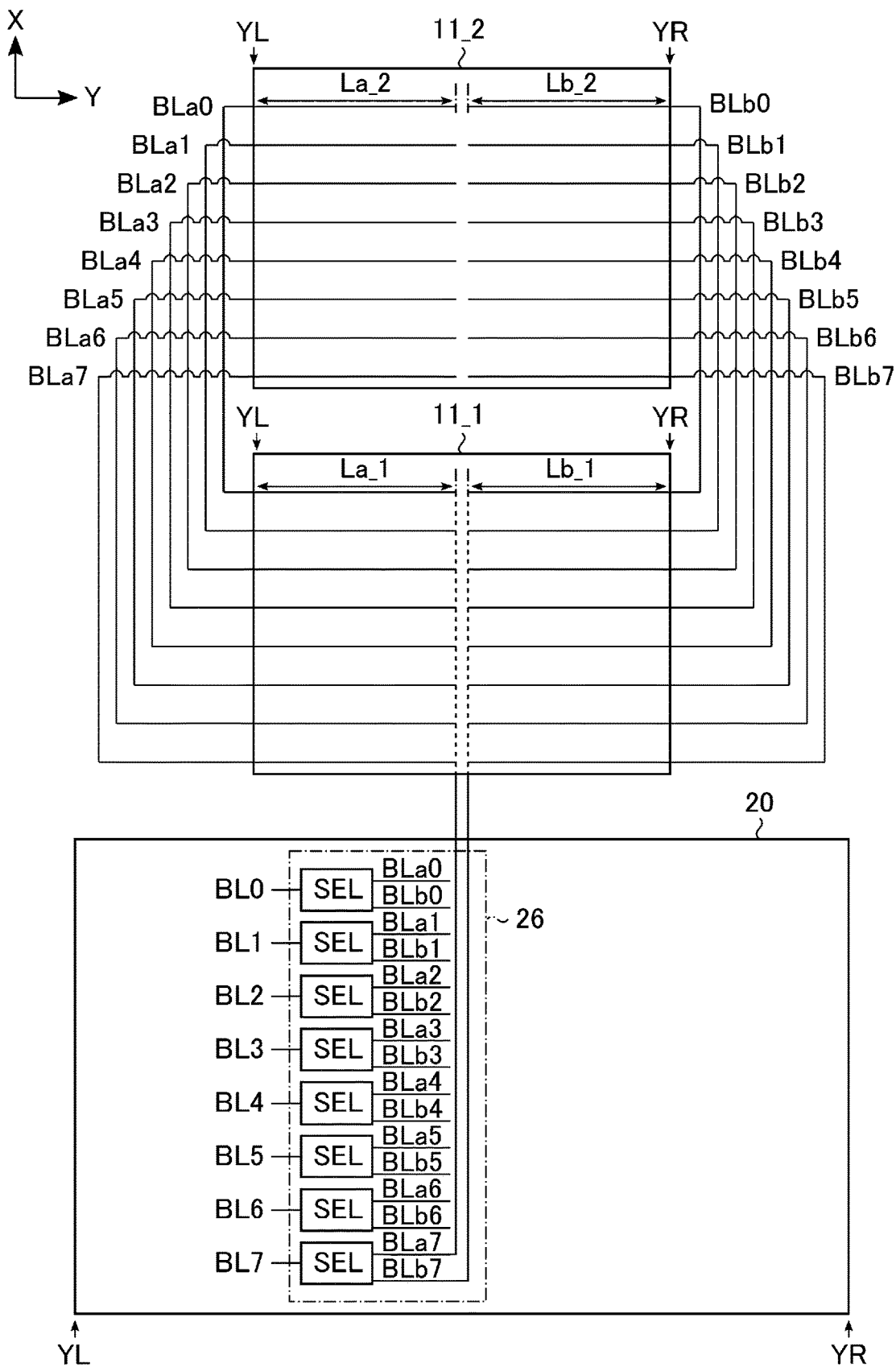
FIG. 21 depicts a circuit chip and a core portion of a memory cell array according to a third example of a fourth embodiment in a plane.

Next, a third example will be described with reference to FIGS. 20 and 21. In the third example, a layout of the bit lines BL applicable to the second and third embodiments will be described. FIG. 20 is a conceptual diagram illustrating the circuit chip 20, the core portion of the memory cell array 11_1, and the core portion of the memory cell array 11_2 in perspective view. FIG. 21 is a conceptual diagram illustrating the circuit chip 20, the core portion of the memory cell array 11_1, and the core portion of the memory cell array 11_2 in a plane. In FIGS. 20 and 21, elements other than the bit lines BL and the BL selection circuit 26 are not illustrated for simplicity.

As illustrated in FIG. 20, in the memory cell array 11_1 and 11_2, each bit line BL is divided into two bit lines in the Y-direction. Hereinafter, the bit lines BL drawn out to the end portion YL side is referred to as bit lines BLa, and the bit lines BL drawn out to the end portion YR side is referred to as bit lines BLb. Each string unit SU in the memory cell array 11 is connected to any of the bit lines BLa and BLb. The combination of the connections between the bit lines BLa and BLb and the string unit SU may be freely designed. The memory cell arrays 11_1 and 11_2 share the bit lines BLa and BLb.

In the circuit chip 20, the BL selection circuit 26 is disposed in the vicinity of the center in the Y-direction. The bit lines BLa and BLb are connected to corresponding selectors SEL. Accordingly, the selector SEL in this example functions as a circuit for selecting the bit line BLa or the bit line BLb.

The bit lines BLa and BLb are drawn toward the circuit chip 20 in the vicinity of the center of the memory cell array 11_1 in the Y-direction. The selectors SELs are preferably disposed below the corresponding bit lines BLa and BLb so that the wiring length of the bit lines BLa and the wiring length of the bit lines BLb are the same.

More specifically, as illustrated in FIG. 21, in the memory cell array 11_1 and 11_2, for example, the bit line BL0 is divided into bit lines BLa0 and BLb0. The bit line BL1 is divided into bit lines BLa1 and BLb1. The bit line BL2 is divided into bit lines BLa2 and BLb2. The bit line BL3 is divided into bit lines BLa3 and BLb3. The bit line BL4 is divided into bit lines BLa4 and BLb4. The bit line BL5 is divided into bit lines BLa5 and BLb5. The bit line BL6 is divided into bit lines BLa6 and BLb6. The bit line BL7 is divided into bit lines BLa7 and BLb7.

The bit line BLa0 of the memory cell array 11_1 and the bit line BLa0 of the memory cell array 11_2 are connected at the end portion YL side. The same applies to the other bit lines BLa1 to BLa7.

The bit line BLb0 of the memory cell array 11_1 and the bit line BLb0 of the memory cell array 11_2 are connected at the end portion YR side. The same applies to the other bit lines BLb1 to BLb7.

The length of the bit line BLa0 and length of the bit line BLb0 of the memory cell array 11_1 are set to La_1 and Lb_1, respectively. Similarly, the length of the bit line BLa0 and length of the bit line BLb of the memory cell array 11_2 are set to La_2 and Lb_2, respectively. In this example, the length La_1, the length La_2, the length Lb_1, and the length Lb_2 are approximately equal to each other. For that reason, the length of the bit line BLa0 and the length of the bit line BLb0 are approximately equal to each other. The same applies to the other bit lines BLa and BLb. That is, the lengths of the bit lines BLa0 to BLa7 and the bit lines BLb0 to BLb7 are approximately equal to each other.

The bit lines BLa0 to BLa7 and BLb0 to BLb7 are drawn toward the circuit chip 20 in the vicinity of the center of the memory cell array 11_1 in the Y-direction.

In the circuit chip 20, the BL selection circuit 26 is disposed in the vicinity of the center in the Y-direction. Then, for example, a plurality of selectors SELs are disposed side by side in the X-direction. The selectors SELs are disposed below the corresponding bit lines BLa and BLb. The selectors SEL are connected to the bit lines BLa and BLb drawn from the memory cell array 11_1.

More specifically, the bit lines BLa0 and BLb0 are connected to the selector SEL to which the bit line BL0 is connected. The bit lines BLa1 and BLb1 are connected to the selector SEL to which the bit line BL1 is connected. The bit lines BLa2 and BLb2 are connected to the selector SEL to which the bit line BL2 is connected. The bit lines BLa3 and BLb3 are connected to the selector SEL to which the bit line BL3 is connected. The bit lines BLa4 and BLb4 are connected to the selector SEL to which the bit line BL4 is connected. The bit lines BLa5 and BLb5 are connected to the selector SEL to which the bit line BL5 is connected. The bit lines BLa6 and BLb6 are connected to the selector SEL to which the bit line BL6 is connected. The bit lines BLa7 and BLb7 are connected to the selector SEL to which the bit line BL7 is connected.

The bit lines BLa0 to BLa7 and BLb0 to BLb7 have substantially the same overall length from one end in the vicinity of the center of the memory cell array 11_2 to the other end thereof connected to the selector SEL.

4.4 Fourth Example

Figure 22:
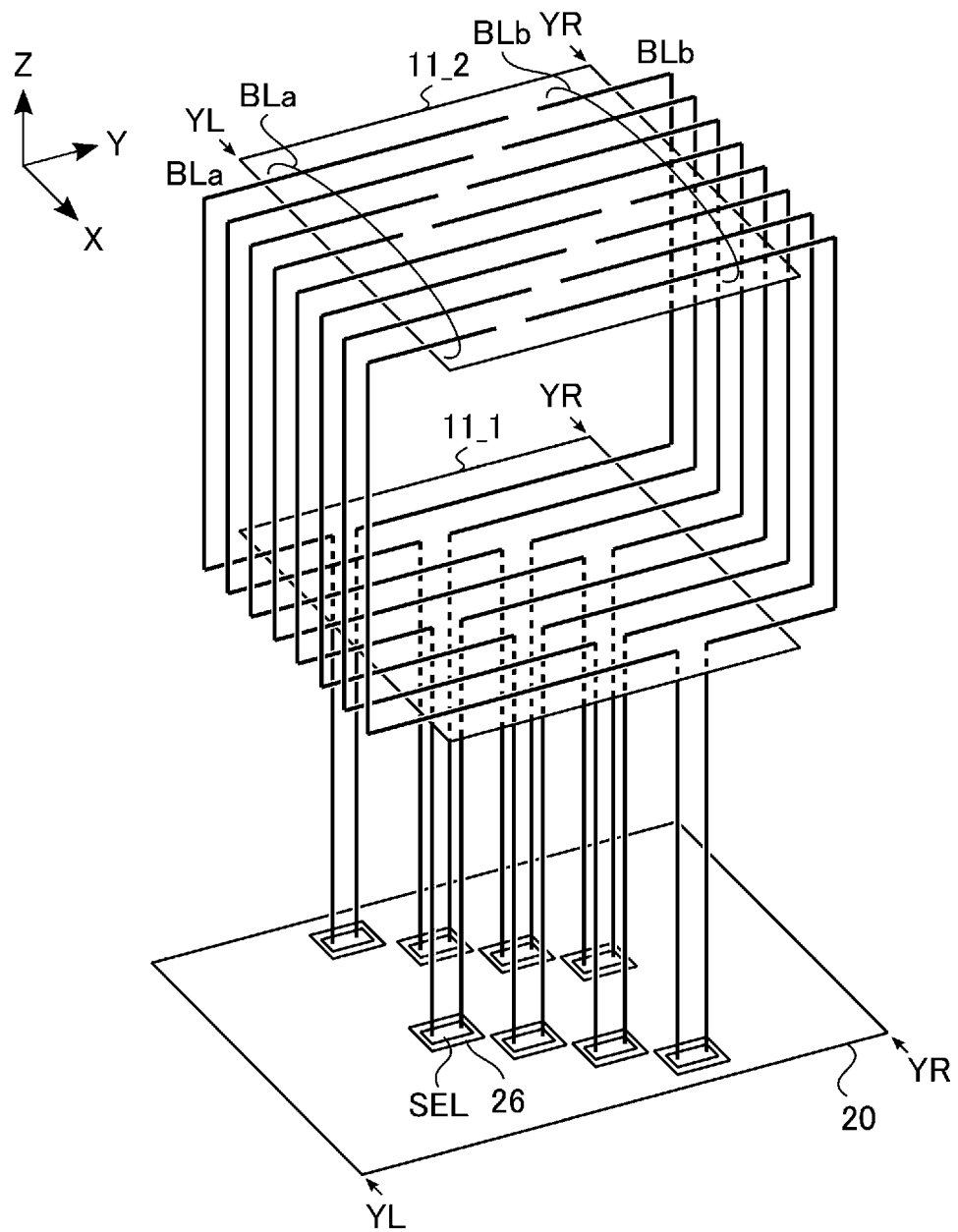
FIG. 22 depicts a circuit chip and a core portion of a memory cell array according to a fourth example of a fourth embodiment in a plane.
Figure 23:
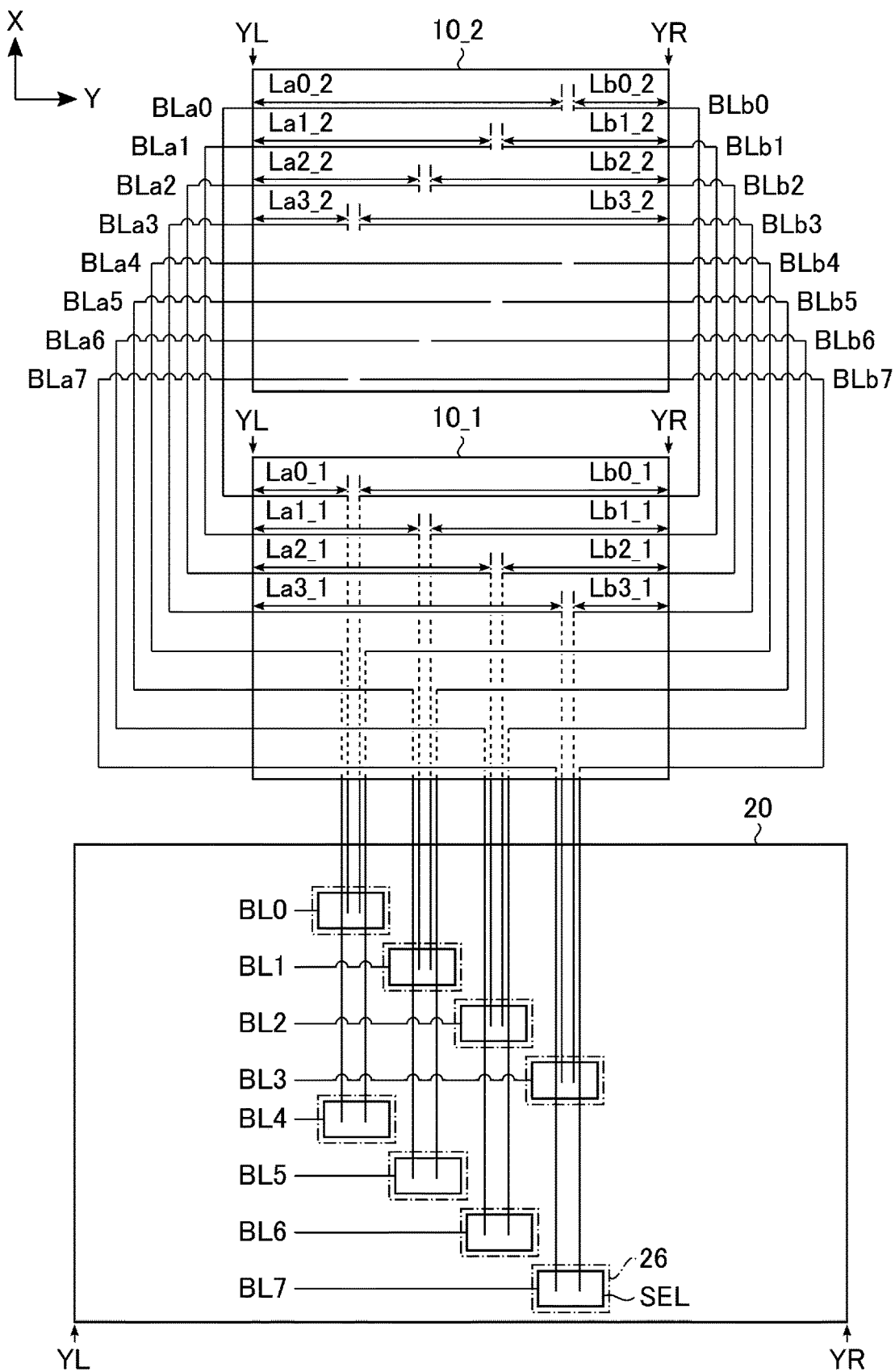
FIG. 23 depicts a circuit chip and a core portion of a memory cell array according to a fourth example of a fourth embodiment in a plane.

Next, a fourth example will be described with reference to FIGS. 22 and 23. In the fourth example, a layout of the bit lines BL applicable to the second and third embodiments will be described. FIG. 22 is a conceptual diagram illustrating the circuit chip 20, the core portion of the memory cell array 11_1, and the core portion of the memory cell array 11_2 in perspective view. FIG. 23 is a conceptual diagram illustrating the circuit chip 20, the core portion of the memory cell array 11_1, and the core portion of the memory cell array 11_2 in a plane. In the examples of FIGS. 22 and 23, elements other than the bit lines BL and the BL selection circuit 26 are not illustrated for simplicity.

As illustrated in FIG. 22, similar to the third example, in the memory cell array 11_1 and 11_2, bit lines BL are divided into two bit lines BLa and BLb in the Y-direction.

In the circuit chip 20, the BL selection circuit 26, that is, the selector SEL is independently disposed for each single bit line BL. The position of the selector SEL on the circuit chip 20 may be freely determined. The selector SEL is preferably disposed below the corresponding bit lines BLa and BLb. The selectors SELs are connected to the ends of the bit lines BLa and BLb drawn from the memory cell array 11_1.

In this example, division positions of the bit lines BLa and BLb in the memory cell array 11 are different for each bit line BL. In other words, the lengths of the plurality of bit lines BLa are different in one memory cell array. Similarly, the lengths of the plurality of bit lines BLb are different in one memory cell array. However, the division positions of the bit lines BLa and BLb in the memory cell arrays 11_1 and 11_2 are determined so that the overall lengths thereof are the same. In other words, the lengths of the bit lines BLa and BLb from one end of the memory cell array 11_2 to the other end connected to the selector SEL are approximately equal to each other. For that reason, the division positions between the bit lines BLa and the bit lines BLb are determined based on the positions of the selectors SEL.

More specifically, as illustrated in FIG. 23, the length of the bit line BLa0 and the length of the bit line BLb0 in the memory cell array 11_1 are set to La0_1 and Lb0_1, respectively. Similarly, the lengths of the bit lines BLa1 to BLa3 and the lengths of the bit lines BLb1 to BLb3 in the memory cell array 11_1 are set to La1_1 to La3_1 and Lb1_1 to Lb3_1, respectively. The lengths of the bit lines BLa0 to BLa3 and the lengths of the bit lines BLb0 to BLb3 in the memory cell array 11_2 are set to La0_2 to La3_2 and Lb0_2 to Lb3_2, respectively.

In the present example, the lengths La0_1 to La3_1 are different from each other. The lengths La0_2 to La3_2 are different from each other. The lengths Lb0_1 to Lb3_1 are different from each other. The lengths Lb0_2 to Lb3_2 are different from each other. Even with such relationships, the length (La0_1+La0_2), length (La1_1+La1_2), length (La2_1+La2_2), length (La3_1+La3_2), length (Lb0_1+Lb0_2), length (Lb1_1+Lb1_2), length (Lb2_1+Lb2_2), and length (Lb3_1+Lb3_2) are approximately equal to each other.

4.5 Effect of This Embodiment

The configuration according to this embodiment can be applied to the first to third embodiments.

According to this embodiment, the wiring lengths of the bit lines BL can be made substantially equal. For that reason, variation in a wiring resistance of the bit line BL can be reduced.

Furthermore, according to the second example and the fourth example, the sense amplifier 25 or the BL selection circuit 26 can be disposed at any position. Accordingly, in the circuit chip 20, the layout including other circuits such as the row decoder 24 can be more easily optimized.

5. Modifications and the Like

The semiconductor memory device 1 according to the embodiments described above includes the first memory cell array 11_1 and the second memory cell array 11_2 disposed above the first memory cell array in the first direction, which corresponds to the Z-direction. The first memory cell array includes the first semiconductor 123 which extends in the first direction. The first memory cell MC and the first select transistor ST1 are connected to the first semiconductor 123. The first word line WL is connected to the gate of the first memory cell MC. The first select gate line SGD is connected to the gate of the first select transistor ST1. The first bit line BL is connected to the first semiconductor layer 123. The second memory cell array includes the second semiconductor 123 which extends in the first direction. The second memory cell MC and the second select transistor ST1 are connected the second semiconductor layer 123. The second word line WL connected to the gate of the second memory cell MC. The second select gate line SGD is connected to the gate of the second select transistor. The second bit line BL is connected to the second semiconductor layer 123. The first word line WL and the second word line WL are electrically connected to each other. The first select gate line SGD and the second select gate line SGD are not electrically connected to each other.

By applying the embodiments described above, a semiconductor memory device capable of improving processing capability can be provided.

Embodiments are not limited to those described above, and various modifications may be made thereto.

For example, the embodiments described above may be combined when technically feasible.

In the embodiments described above, the circuit chip 20 and the two array chips 10_1 and 10_2 are bonded to each other, but these chips may be formed on one semiconductor substrate in other embodiments.

In the second embodiment, the third embodiment, and the first example, the third example, and the fourth example of the fourth embodiment, the BL selection circuit may be omitted. In such a case, the bit lines BL provided in the memory cell arrays 11_1 and 11_2 are connected to the sense amplifier 25.

In the embodiments described above, the plurality of wiring layers 102 may be drawn out in a form of steps at the plug connection portion. In such a case, the contact plug CP1 can be connected to the stepped portion of the wiring layer 102.

Furthermore, "approximately equal" in the description of embodiments means "equal" or "equal when differences related to usual a manufacturing tolerances and/or errors due to normal manufacturing variation are excluded".

The term "connection" in the description encompasses being indirectly connected via something else such as a transistor or a resistor interposed between the connected aspects or elements in connection with each other.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor memory device, comprising:
   a first memory cell array;
   a second memory cell array above the first memory cell array in a first direction; and
   a first driver transistor below the first memory cell array in the first direction, wherein
   the first memory cell array includes:
      a first semiconductor portion that extends along the first direction, a first memory cell and a first select transistor being formed on the first semiconductor portion,
      a first word line connected to a gate of the first memory cell,
      a first select gate line connected to a gate of the first select transistor,
      a first bit line electrically connected to the first semiconductor portion,
      a first contact connected to the first word line and extending along the first direction,
      a first wiring connected to the first contact and extending along a second direction crossing the first direction,
      a second contact connected to the first wiring and extending along the first direction, and
      a first pad above the second contact and electrically connected to the first and second contacts,
      the first bit line being located between the first driver transistor and the first select gate line in the first direction,
   the second memory cell array includes:
      a second semiconductor portion that extends along the first direction, a second memory cell and a second select transistor being formed on the second semiconductor portion,
      a second word line connected to a gate of the second memory cell,
      a second select gate line connected to a gate of the second select transistor,
      a second bit line electrically connected to the second semiconductor portion,
      a third contact connected to the second word line and extending along the first direction,
      a second wiring connected to the third contact and extending along the second direction, and
      a second pad connected to the second wiring and in direct contact with the first pad, the second pad being electrically connected to the third contact,
   the first and second word lines are electrically connected to each other,
   the first driver transistor is electrically connected to the first and second word lines,
   the first and second select gate lines are not electrically connected to each other, and
   the second memory cell array includes no contacts that extend along the first direction and are located so as to overlap the second pad when viewed along the first direction.

2. The semiconductor memory device according to claim 1, wherein the first and second bit lines are electrically connected to each other.

3. The semiconductor memory device according to claim 2, further comprising:
   a sense amplifier;
   a third wiring extending along the first direction and connected to the first and second bit lines; and
   a fourth wiring extending along the first direction and connected to the third wiring and the sense amplifier.

4. The semiconductor memory device according to claim 1, further comprising:
   a sense amplifier; and
   a selection circuit connected to the sense amplifier and configured to select one of the first and second bit lines to be connected to the sense amplifier.

5. The semiconductor memory device according to claim 4, wherein
   the selection circuit includes a select transistor selectively connectable to one of the first and second bit lines via a wiring that extends from the select transistor along the first direction.

6. The semiconductor memory device according to claim 1, wherein
   the first memory cell array further includes a third bit line that aligns with the first bit line along the second direction and is not electrically connected to the first bit line,
   the second memory cell array further includes a fourth bit line that aligns with the second bit line along the second direction and is not electrically connected to the second bit line,
   the first and second bit lines are connected to each other via a wiring extending along the first direction, and
   the third and fourth bit lines are connected to each other via a wiring extending along the first direction.

7. The semiconductor memory device according to claim 6, wherein a sum of lengths of the first and second bit lines is equal to a sum of lengths of the third and fourth bit lines.

8. The semiconductor memory device according to claim 7, wherein the first bit line is shorter than the second and third bit lines.

9. The semiconductor memory device according to claim 6, further comprising:
   a sense amplifier; and
   a selection circuit connected to the sense amplifier and configured to select one of the first and third bit lines to be connected to the sense amplifier.

10. The semiconductor memory device according to claim 1, wherein the second semiconductor portion is above the first semiconductor portion in the first direction.

11. The semiconductor memory device according to claim 1, wherein the second bit line is above the first bit line in the first direction.

12. The semiconductor memory device according to claim 1, wherein the second contact penetrates the first word line.

13. The semiconductor memory device according to claim 1, further comprising:
- a sense amplifier provided below the first memory cell array and electrically connected to the first and second bit lines;
- a fourth contact extending along the first direction in the first memory cell array and electrically connected to the first bit line;
- a third pad on the fourth contact; and
- a fourth pad electrically connected to the second bit line and in direct contact with the third pad, wherein
- the second memory cell array includes no contacts that extend along the first direction and are located so as to overlap the fourth pad when viewed along the first direction.

* * * * *